(12) United States Patent
Jung et al.

(10) Patent No.: US 11,943,697 B2
(45) Date of Patent: Mar. 26, 2024

(54) SIGNALING OF ASSOCIATED NETWORK IDENTIFIER

(71) Applicant: LG ELECTRONICS INC., Seoul (KR)

(72) Inventors: Sunghoon Jung, Seoul (KR); Hyunjung Choe, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/978,814

(22) Filed: Nov. 1, 2022

(65) Prior Publication Data

US 2023/0075285 A1  Mar. 9, 2023

Related U.S. Application Data

(63) Continuation of application No. PCT/KR2022/004601, filed on Mar. 31, 2022.

(30) Foreign Application Priority Data

Mar. 31, 2021  (KR) .......................... 10-2021-0042131

(51) Int. Cl.
*H04W 48/08* (2009.01)
*H04W 48/18* (2009.01)
*H04W 60/00* (2009.01)

(52) U.S. Cl.
CPC ........... *H04W 48/08* (2013.01); *H04W 48/18* (2013.01); *H04W 60/00* (2013.01)

(58) Field of Classification Search
CPC ...... H04W 48/08; H04W 48/18; H04W 60/00
See application file for complete search history.

(56) References Cited

U.S. PATENT DOCUMENTS 10,849,052 B2 * 11/2020 Shih ...................... H04W 76/27
2020/0329422 A1  10/2020 Sirotkin et al.
(Continued)

FOREIGN PATENT DOCUMENTS

WO  2020/194273 A1  10/2020
WO  2020/204501 A1  10/2020

OTHER PUBLICATIONS

"3rd Generation Partnership Project; Technical Specification Group Radio Access Network; NR; User Equipment (UE) procedures in Idle mode and RRC Inactive state (Release 16)", 3GPP TS 38.304 V16.3.0 (Dec. 2020), sections 5-5.1.2.2.

(Continued)

*Primary Examiner* — Steven S Kelley
(74) *Attorney, Agent, or Firm* — BRYAN CAVE LEIGHTON PAISNER LLP

(57) ABSTRACT

The present disclosure relates to a signalling of associated network identifiers (IDs) in wireless communications. According to an embodiment of the present disclosure, the UE may be configured with a list of stand-alone non-public networks (SNPN) identifiers, a list of group identifiers of network and a list of bitmaps, which have a relationship such that: i) n-th entry in the list of bitmaps corresponds to n-th SNPN in the list of SNPN identifiers; ii) k-th bit from left side in each bitmap corresponds to k-th group identifier among group identifiers related to the list of group identifiers; and iii) a bit set to positive indication in a bitmap informs that a corresponding group identifier is supported by a SNPN corresponding to the bitmap.

13 Claims, 16 Drawing Sheets

(56) References Cited

U.S. PATENT DOCUMENTS

| | | | |
|---|---|---|---|
| 2021/0058784 A1* | 2/2021 | Kedalagudde | H04W 48/18 |
| 2021/0100062 A1* | 4/2021 | Joseph | H04W 76/27 |
| 2021/0105852 A1* | 4/2021 | Shih | H04W 72/231 |
| 2021/0297937 A1* | 9/2021 | Baek | H04W 48/12 |
| 2021/0345226 A1* | 11/2021 | Liao | H04W 48/18 |
| 2022/0070649 A1* | 3/2022 | Sahin | H04L 65/1073 |
| 2022/0070652 A1* | 3/2022 | Grayson | H04W 8/28 |
| 2022/0240210 A1* | 7/2022 | Lai | H04W 60/00 |
| 2022/0272612 A1* | 8/2022 | Ingale | H04W 48/10 |
| 2022/0286850 A1* | 9/2022 | Lin | H04W 12/72 |
| 2022/0322182 A1* | 10/2022 | Lee | H04W 36/0061 |

OTHER PUBLICATIONS

"3rd Generation Partnership Project; Technical Specification Group Services and System Aspects; Study on enhanced support of non-public networks (Release 17)", 3GPP TR 23.700-07 V2.0.0 (Mar. 2021), sections 6.2.1-6.2.3.3.2.

"3rd Generation Partnership Project; Technical Specification Group Radio Access Network; NR; Radio Resource Control (RRC) protocol specification (Release 16)", 3GPP TS 38.331 V16.0.0 (Mar. 2020).

"3rd Generation Partnership Project; Technical Specification Group Radio Access Network; NR; User Equipment (UE) procedures in Idle mode and RRC Inactive state (Release 16)", 3GPP TS 38.304 V16.0.0 (Mar. 2020).

"3rd Generation Partnership Project; Technical Specification Group Radio Access Network; NR; NR and NG-RAN Overall Description; Stage 2 (Release 15)", 3GPP TS 38.300 V15.6.0 (Jun. 2019).

"3rd Generation Partnership Project; Technical Specification Group Services and System Aspects; Study on enhanced support of Non-Public Networks (NPN) (Release 17)", 3GPP TR 23.700-07 V17.0.0 (Mar. 2021).

* cited by examiner

FIG. 10
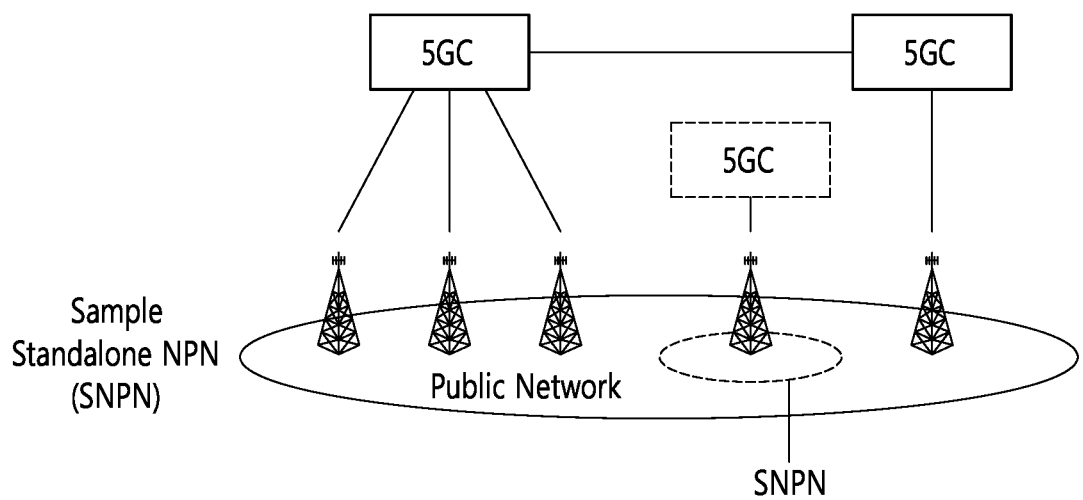
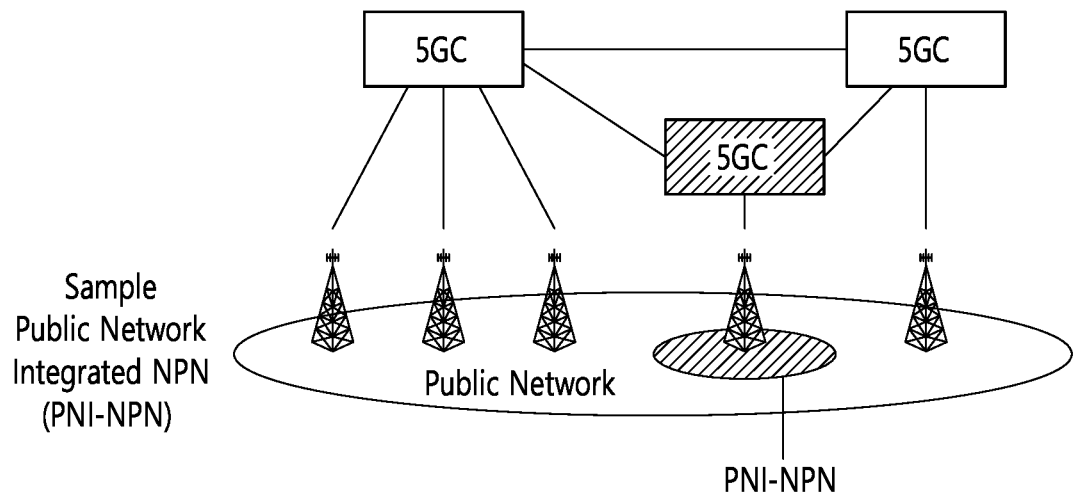

SIGNALING OF ASSOCIATED NETWORK IDENTIFIER

CROSS-REFERENCE TO RELATED APPLICATIONS

This application is a Continuation Application of International Application No. PCT/KR2022/004601, filed on Mar. 31, 2022, which claims the benefit of and priority to Korean Application No. 10-2021-0042131, filed on Mar. 31, 2021, the contents of which are all hereby incorporated by reference herein in their entirety.

TECHNICAL FIELD

The present disclosure relates to a signalling of associated network identifiers (IDs) in wireless communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

A user equipment (UE) should access to a network for communication. In the access procedure, a network identifier (ID) may be required. The network may signal a network ID to a UE, and the UE may access to the network using the network ID. Therefore, signalling of network ID needs to be discussed.

SUMMARY

An aspect of the present disclosure is to provide method and apparatus for signalling of associated network ID in a wireless communication system.

Another aspect of the present disclosure is to provide method and apparatus for signalling of associated network ID in a stand-alone non-public network (SNPN) in a wireless communication system.

According to an embodiment of the present disclosure, a method performed by a user equipment (UE) configured to operate in a wireless communication system comprises: receiving, from a network, first system information for a list of stand-alone non-public networks (SNPN) identifiers; receiving, from the network, second system information comprising information for a list of group identifiers of network and information for a list of bitmaps; identifying one or more group identifiers supported by each SNPN in the list of SNPN identifiers based on the first system information and the second system information; selecting a SNPN based on the list of SNPN identifiers and one or more group identifiers of network supported by the SNPN; and selecting a cell of the selected SNPN to camp on the cell. The n-th entry in the list of bitmaps corresponds to n-th SNPN in the list of SNPN identifiers. The k-th bit from left side in each bitmap corresponds to k-th group identifier among group identifiers related to the list of group identifiers. A bit set to positive indication in a bitmap informs that a corresponding group identifier is supported by a SNPN corresponding to the bitmap.

According to an embodiment of the present disclosure, a user equipment (UE) configured to operate in a wireless communication system comprises: at least one transceiver; at least processor; and at least one computer memory operably connectable to the at least one processor and storing instructions that, based on being executed by the at least one processor, perform operations comprising: receiving, from a network, first system information for a list of stand-alone non-public networks (SNPN) identifiers; receiving, from the network, second system information comprising information for a list of group identifiers of network and information for a list of bitmaps; identifying one or more group identifiers supported by each SNPN in the list of SNPN identifiers based on the first system information and the second system information; selecting a SNPN based on the list of SNPN identifiers and one or more group identifiers of network supported by the SNPN; and selecting a cell of the selected SNPN to camp on the cell. The n-th entry in the list of bitmaps corresponds to n-th SNPN in the list of SNPN identifiers. The k-th bit from left side in each bitmap corresponds to k-th group identifier among group identifiers related to the list of group identifiers. A bit set to positive indication in a bitmap informs that a corresponding group identifier is supported by a SNPN corresponding to the bitmap.

According to an embodiment of the present disclosure, at least one computer readable medium (CRM) stores instructions that, based on being executed by at least one processor, perform operations comprising: receiving, from a network, first system information for a list of stand-alone non-public networks (SNPN) identifiers; receiving, from the network, second system information comprising information for a list of group identifiers of network and information for a list of bitmaps; identifying one or more group identifiers supported by each SNPN in the list of SNPN identifiers based on the first system information and the second system information; selecting a SNPN based on the list of SNPN identifiers and one or more group identifiers of network supported by the SNPN; and selecting a cell of the selected SNPN to camp on the cell. The n-th entry in the list of bitmaps corresponds to n-th SNPN in the list of SNPN identifiers. The k-th bit from left side in each bitmap corresponds to k-th group identifier among group identifiers related to the list of group identifiers. A bit set to positive indication in a bitmap informs that a corresponding group identifier is supported by a SNPN corresponding to the bitmap.

According to an embodiment of the present disclosure, an apparatus configured to operate in a wireless communication system comprises: at least processor; and at least one computer memory operably connectable to the at least one processor. The at least one processor is configured to perform operations comprising: receiving, from a network, first system information for a list of stand-alone non-public networks (SNPN) identifiers; receiving, from the network, second system information comprising information for a list of group identifiers of network and information for a list of bitmaps; identifying one or more group identifiers supported by each SNPN in the list of SNPN identifiers based on the first system information and the second system information; selecting a SNPN based on the list of SNPN identifiers and one or more group identifiers of network supported by the SNPN; and selecting a cell of the selected SNPN to camp on the cell. The n-th entry in the list of bitmaps corresponds to n-th SNPN in the list of SNPN identifiers. The k-th bit from left side in each bitmap corresponds to k-th group identifier among group identifiers related to the list of group identifiers. A bit set to positive indication in a bitmap informs that a corresponding group identifier is supported by a SNPN corresponding to the bitmap.

According to an embodiment of the present disclosure, a method performed by a network node configured to operate in a wireless communication system comprises: transmitting, to a user equipment (UE), first system information for a list of stand-alone non-public networks (SNPN) identifiers; transmitting, to the UE, second system information comprising information for a list of group identifiers of network and information for a list of bitmaps; and receiving, from the UE, a signalling to access to an SNPN selected based on the list of SNPN identifiers and one or more group identifiers of network supported by the SNPN. One or more group identifiers supported by each SNPN in the list of SNPN identifiers are identified based on the first system information and the second system information. The n-th entry in the list of bitmaps corresponds to n-th SNPN in the list of SNPN identifiers. The k-th bit from left side in each bitmap corresponds to k-th group identifier among group identifiers related to the list of group identifiers. A bit set to positive indication in a bitmap informs that a corresponding group identifier is supported by a SNPN corresponding to the bitmap.

According to an embodiment of the present disclosure, a network node configured to operate in a wireless communication system comprises: at least one transceiver; at least one processor; and at least one computer memory operably connectable to the at least one processor and storing instructions that, based on being executed by the at least one processor, perform operations comprising: transmitting, to a user equipment (UE), first system information for a list of stand-alone non-public networks (SNPN) identifiers; transmitting, to the UE, second system information comprising information for a list of group identifiers of network and information for a list of bitmaps; and receiving, from the UE, a signalling to access to an SNPN selected based on the list of SNPN identifiers and one or more group identifiers of network supported by the SNPN. One or more group identifiers supported by each SNPN in the list of SNPN identifiers are identified based on the first system information and the second system information. The n-th entry in the list of bitmaps corresponds to n-th SNPN in the list of SNPN identifiers. The k-th bit from left side in each bitmap corresponds to k-th group identifier among group identifiers related to the list of group identifiers. A bit set to positive indication in a bitmap informs that a corresponding group identifier is supported by a SNPN corresponding to the bitmap.

The present disclosure can have various advantageous effects.

For example, according to implementations of the present disclosure, loop problem of conditional mobility execution can be resolved.

For example, signalling overhead required for signalling a GIN list associated with each SNPN may be dramatically reduced. Therefore, the maximum number of GINs that can be signalled can be increased (that is, more GIN signalling space can be guaranteed).

For example, network can configure/apply GINs more flexibly.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 10 shows an example of SNPN and PNI-NPN according to an embodiment of the present disclosure.

DETAILED DESCRIPTION

Figure 1:
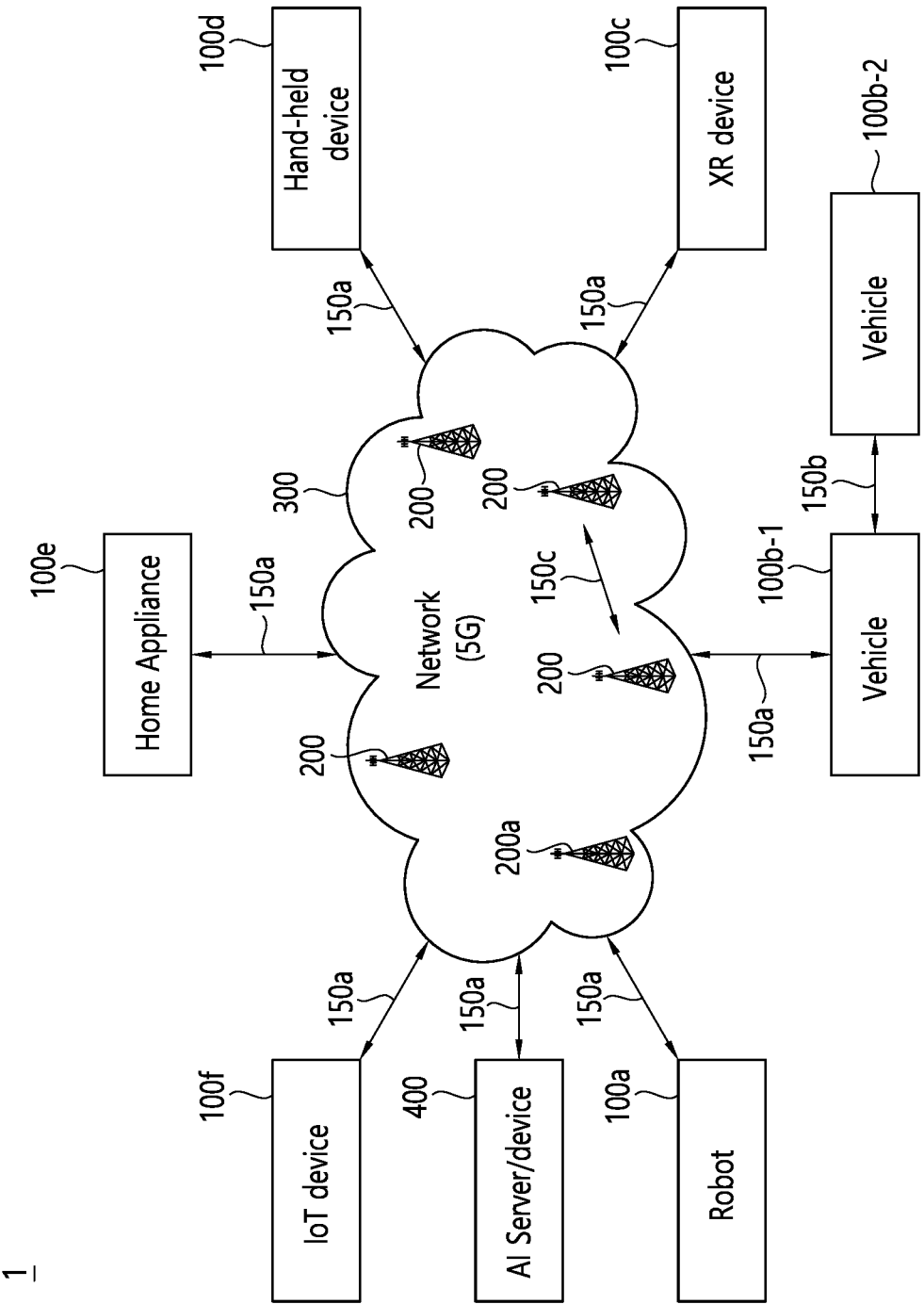
FIG. 1 shows an example of a communication system to which implementations of the present disclosure is applied.

The following techniques, apparatuses, and systems may be applied to a variety of wireless multiple access systems.

Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

Throughout the disclosure, the terms 'cell quality', 'signal strength', 'signal quality', 'channel state', 'channel quality', 'channel state/reference signal received power (RSRP)' and 'reference signal received quality (RSRQ)' may be used interchangeably.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (JAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Figure 2:
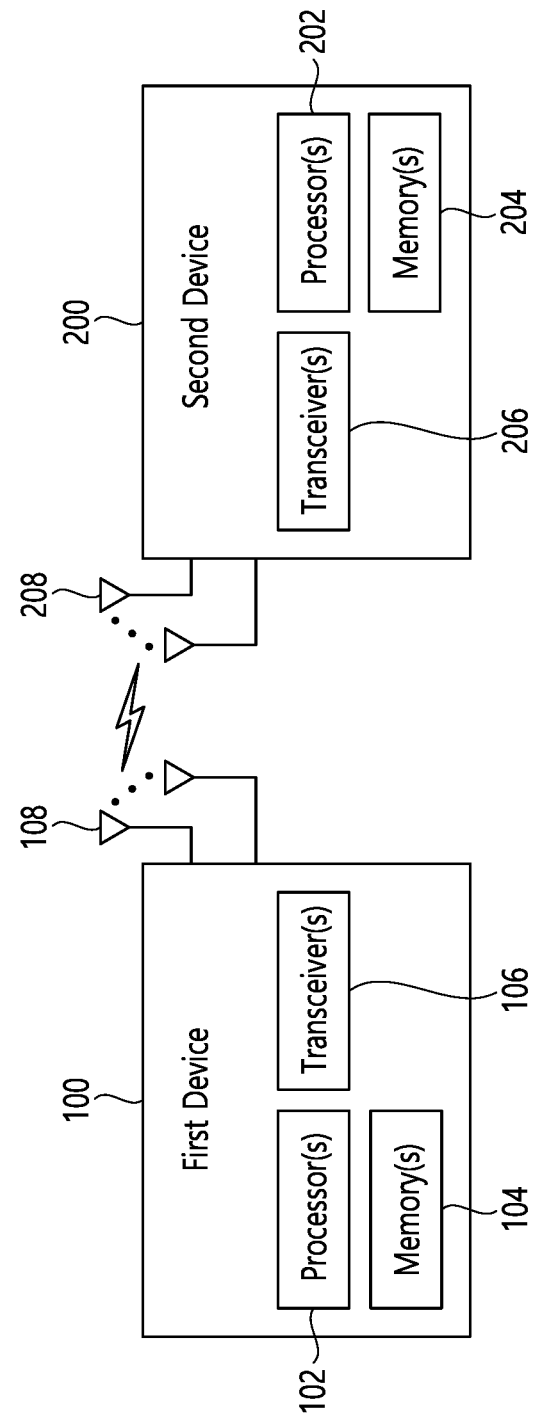
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
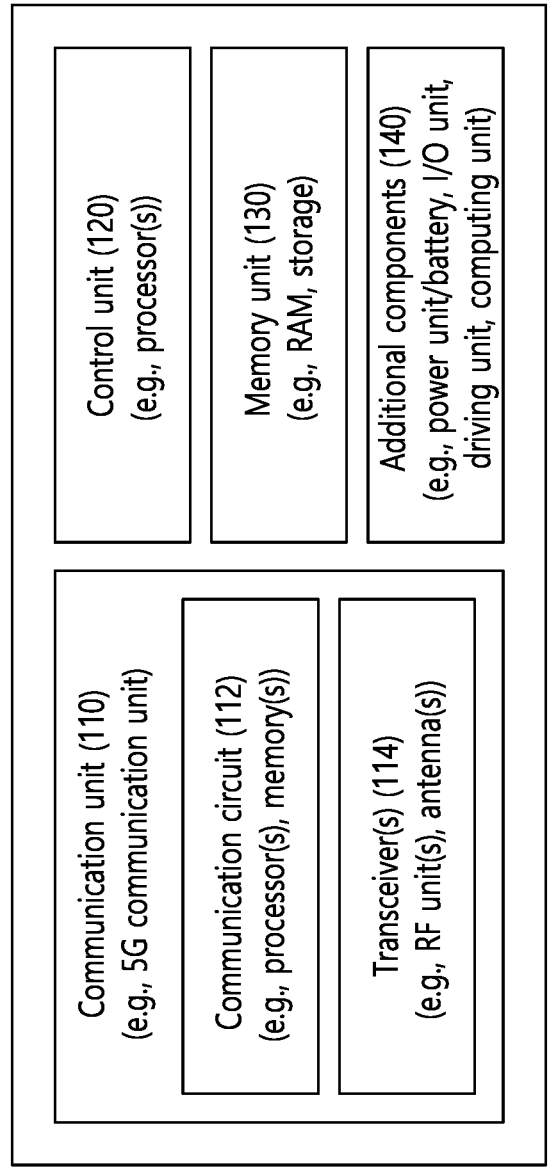
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG.

1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
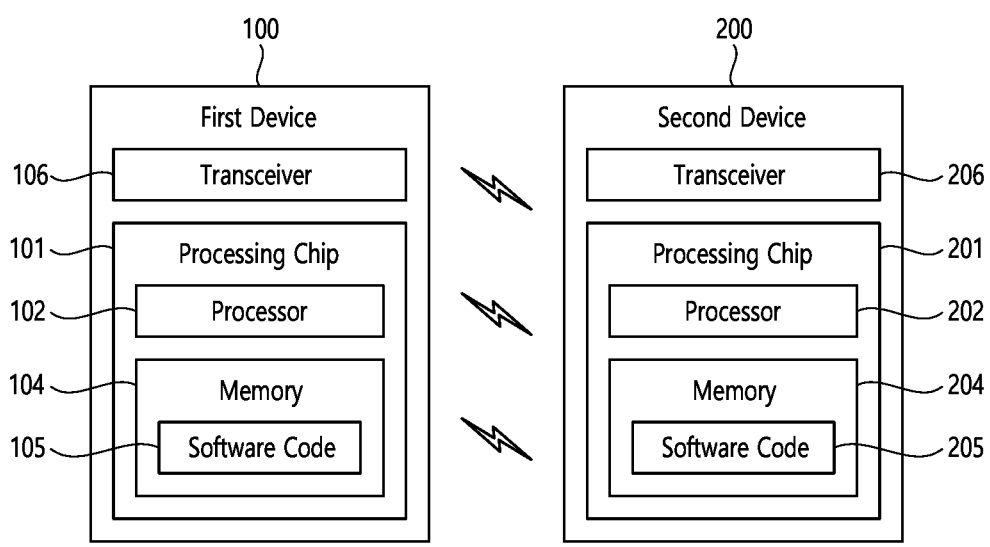
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
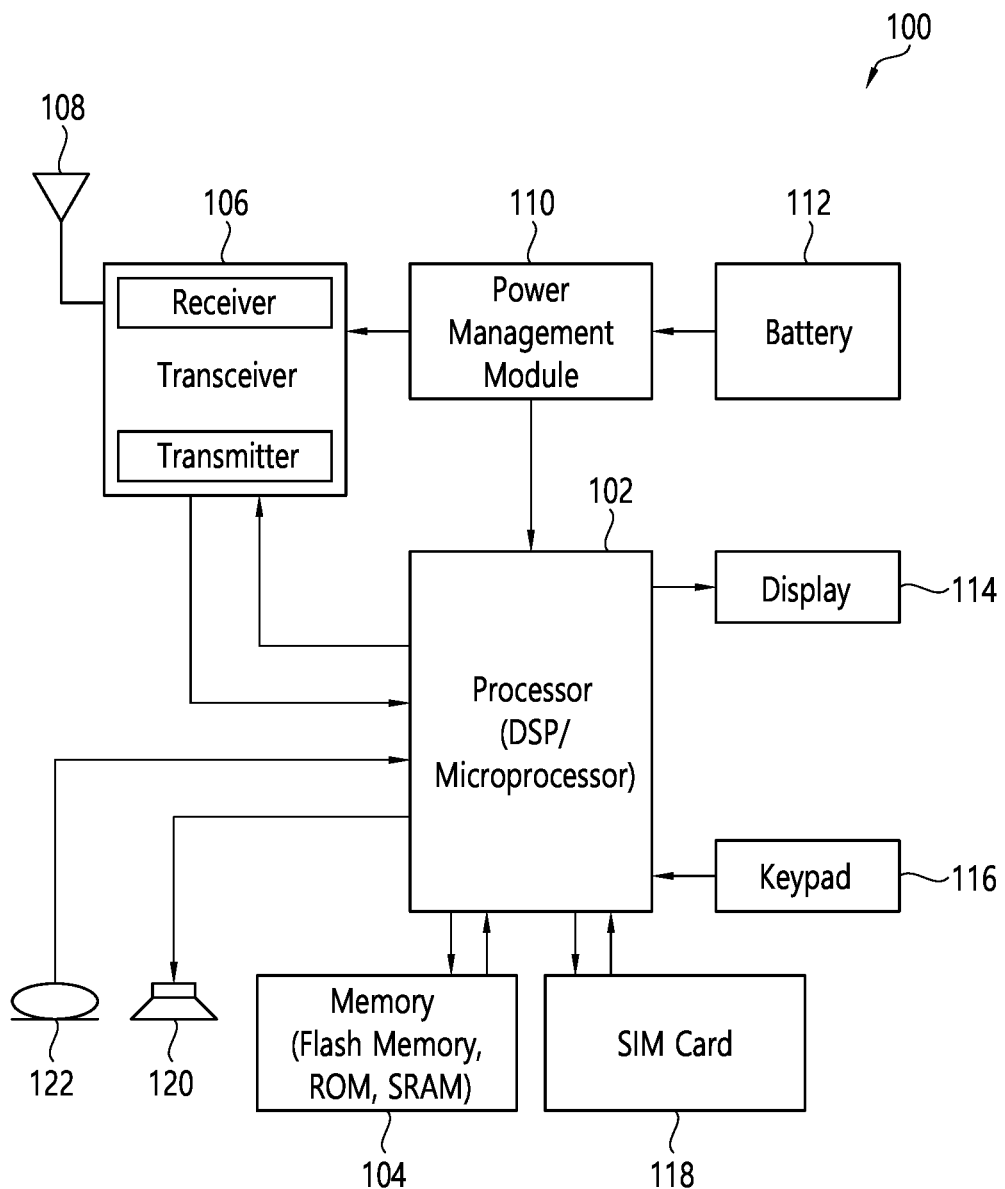
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
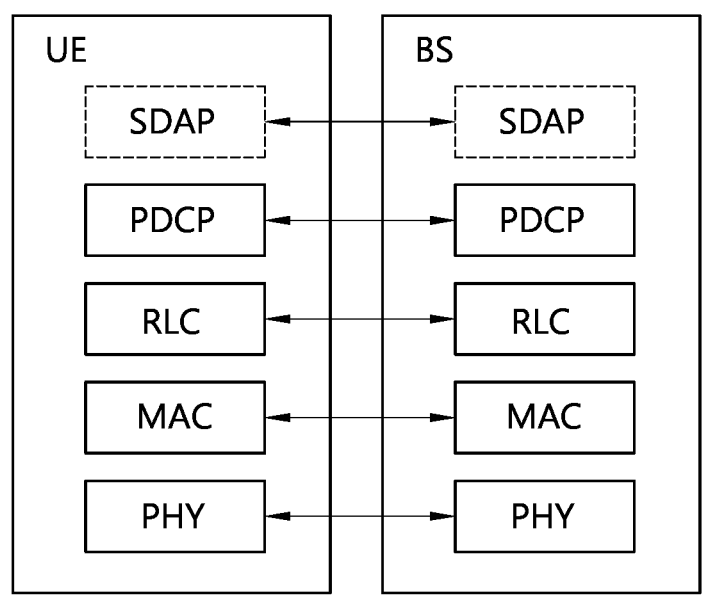
FIGS. 6 and 7 show an example of protocol stacks in a 3GPP based wireless communication system to which implementations of the present disclosure is applied.
Figure 7:
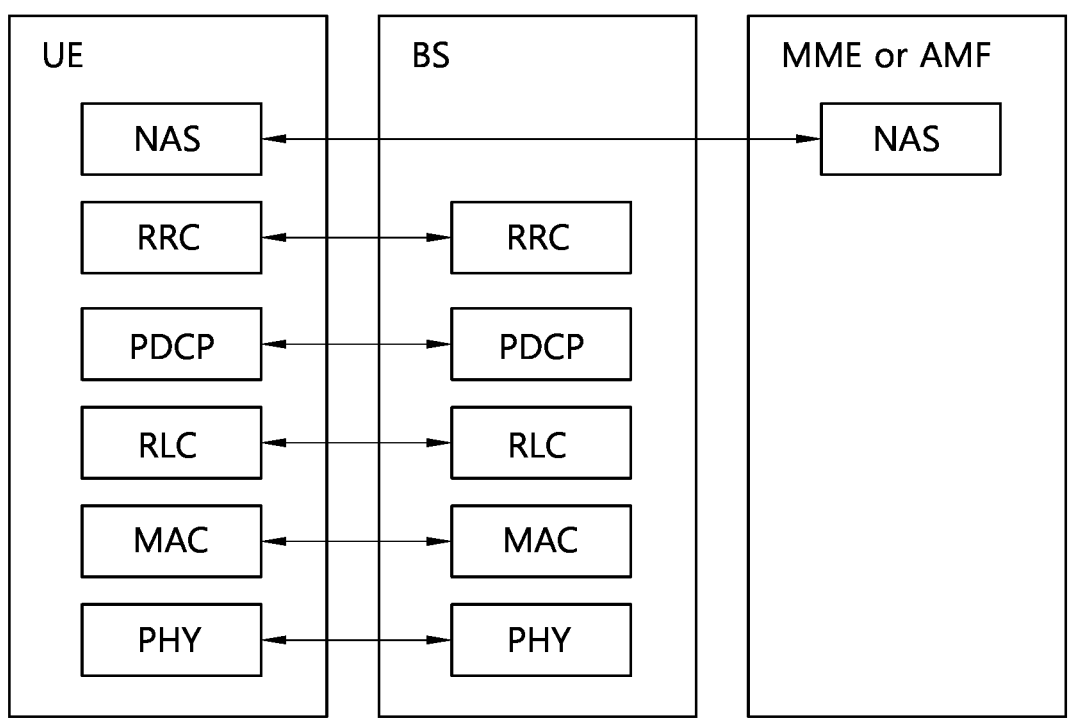

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
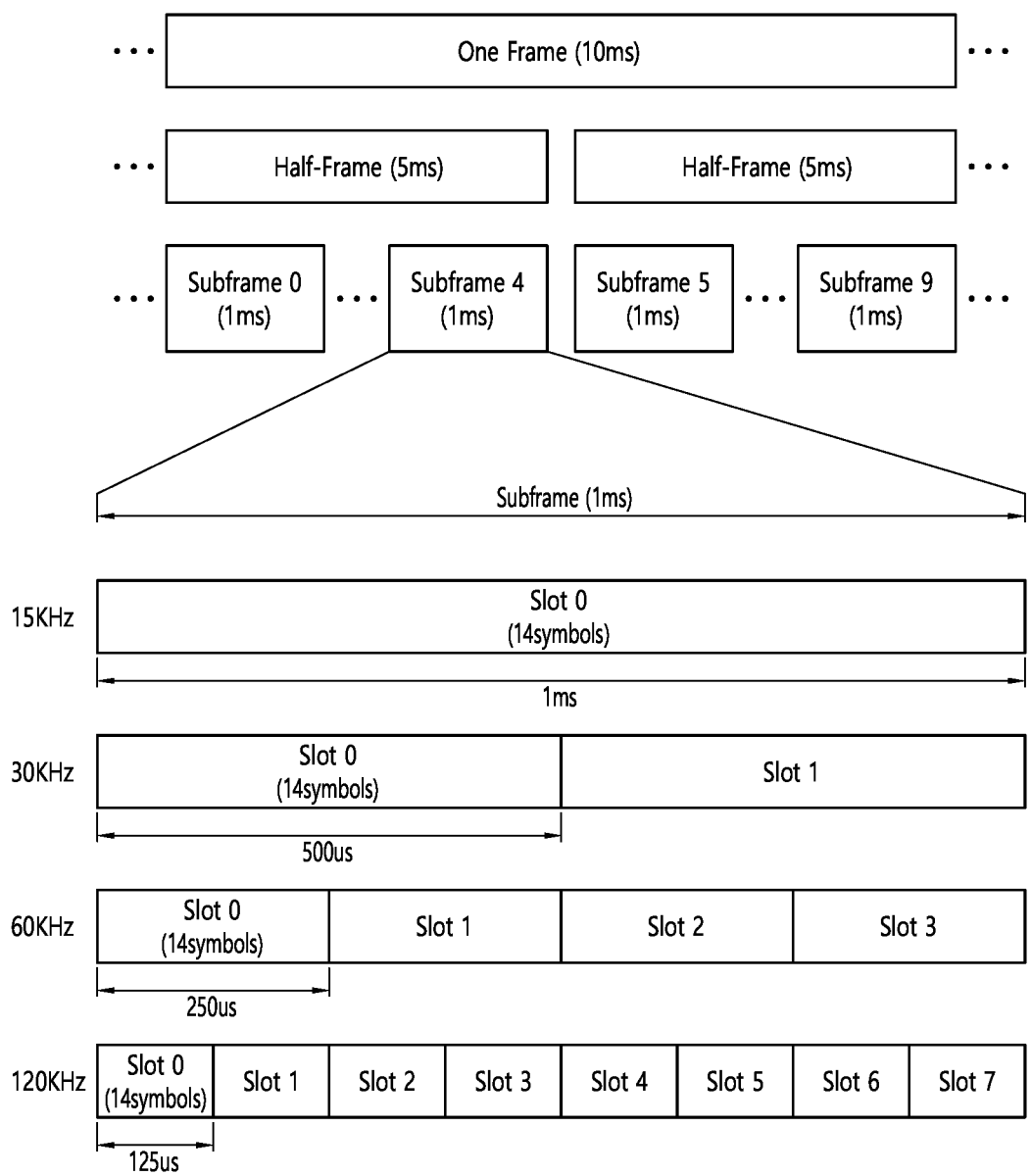
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\beta f=2^u*15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\beta f=2^u*15$ kHz.

TABLE 1

| u | $N_{symb}^{slot}$ | $N_{slot}^{fame,u}$ | $N_{slot}^{subframe,u}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\beta f=2^u*15$ kHz.

TABLE 2

| u | $N_{symb}^{slot}$ | $N_{slot}^{fame,u}$ | $N_{slot}^{subframe,u}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times. In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
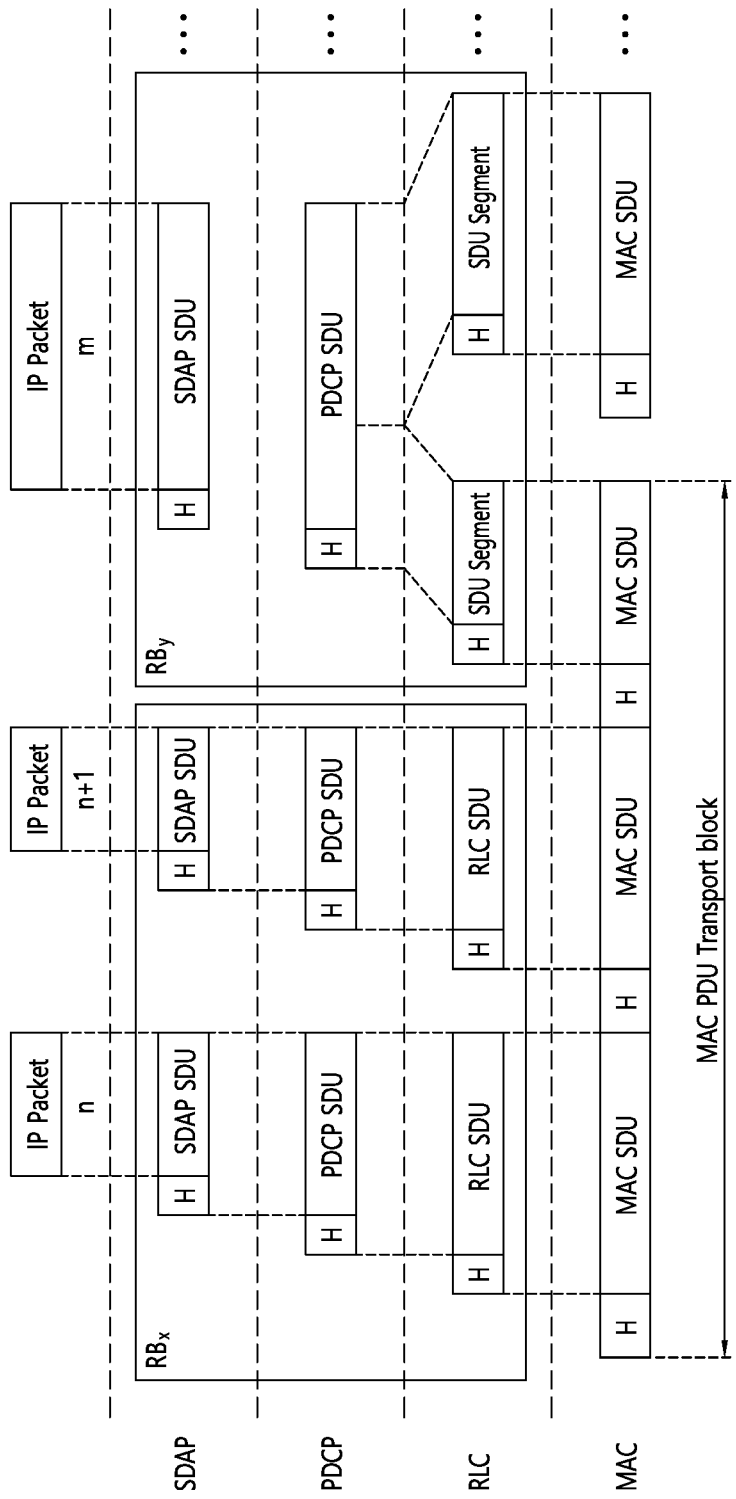
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels physical uplink shared channel (PUSCH) and physical random access channel (PRACH), respectively, and the downlink transport channels DL-SCH, BCH and PCH are mapped to physical downlink shared channel (PDSCH), physical broadcast channel (PBCH) and PDSCH, respectively. In the PHY layer, uplink control information (UCI) is mapped to physical uplink control channel (PUCCH), and downlink control information (DCI) is mapped to physical downlink control channel (PDCCH). A MAC PDU related to UL-SCH is transmitted by a UE via a PUSCH based on an UL grant, and a MAC PDU related to DL-SCH is transmitted by a BS via a PDSCH based on a DL assignment.

Hereinafter, contents regarding a non-public network (NPN) are described.

An NPN is a 5GS deployed for non-public use. Non-public networks are intended for the sole use of a private entity such as an enterprise, and may be deployed in a variety of configurations, utilising both virtual and physical elements. Specifically, they may be deployed as completely standalone networks, they may be hosted by a PLMN, or they may be offered as a slice of a PLMN.

In any of these deployment options, it is expected that unauthorized UEs, those that are not associated with the enterprise, will not attempt to access the non-public network, which could result in resources being used to reject that UE and thereby not be available for the UEs of the enterprise. It is also expected that UEs of the enterprise will not attempt to access a network they are not authorized to access. For example, some enterprise UEs may be restricted to only access the non-public network of the enterprise, even if PLMN coverage is available in the same geographic area. Other enterprise UEs may be able to access both a non-public network and a PLMN where specifically allowed.

An NPN is either a Stand-alone Non-Public Network (SNPN) or a Public Network Integrated NPN (PNI-NPN), as illustrated in FIG. 10.

FIG. 10 shows an example of SNPN and PNI-NPN according to an embodiment of the present disclosure.

Referring to FIG. 10, the SNPN may be operated by an NPN operator and not relying on network functions provided by a PLMN. The PNI-NPN may be an NPN with the support of a PLMN. An NPN and a PLMN can share NG-RAN.

SNPN 5GS deployments are based on the architecture for 5GC with untrusted non-3GPP access for access to SNPN services via a PLMN (and vice versa).

Alternatively, a Credentials Holder (CH) may authenticate and authorize access to an SNPN separate from the Credentials Holder.

In the disclosure, direct access to SNPN is specified for 3GPP access only.

Interworking with EPS is not supported for SNPN. Also, emergency services are not supported for SNPN. Furthermore, roaming is not supported for SNPN, e.g. roaming between SNPNs. Handover between SNPNs, between SNPN and PLMN or PNI NPN are not supported. CIoT 5GS optimizations are not supported in SNPNs.

PNI-NPNs are NPNs made available via PLMNs e.g. by means of dedicated DNNs, or by one (or more) Network Slice instances allocated for the NPN. The existing network slicing functionalities may apply. When a PNI-NPN is made available via a PLMN, then the UE shall have a subscription for the PLMN in order to access PNI-NPN.

As network slicing does not enable the possibility to prevent UEs from trying to access the network in areas where the UE is not allowed to use the Network Slice allocated for the NPN, Closed Access Groups (CAGs) may optionally be used to apply access control.

A Closed Access Group identifies a group of subscribers who are permitted to access one or more CAG cells associated to the CAG.

CAG is used for the PNI-NPNs to prevent UE(s), which are not allowed to access the NPN via the associated cell(s), from automatically selecting and accessing the associated CAG cell(s).

CAG is used for access control e.g. authorization at cell selection and configured in the subscription as part of the Mobility Restrictions i.e. independent from any S-NSSAI. CAG is not used as input to AMF selection nor Network Slice selection. If NPN isolation is desired, operator can better support NPN isolation by deploying network slicing for PNI-NPN, configuring dedicated S-NSSAI(s) for the given NPN and restricting NPN's UE subscriptions to these dedicated S-NSSAI(s).

Hereinafter, details of the SNPN are described.

1. Identifiers

The combination of a PLMN ID and Network identifier (NID) identifies an SNPN.

The PLMN ID used for SNPNs is not required to be unique. PLMN IDs reserved for use by private networks can be used for non-public networks, e.g. based on mobile country code (MCC) 999 as assigned by ITU. Alternatively, a PLMN operator can use its own PLMN IDs for SNPN(s) along with NID(s), but registration in a PLMN and mobility between a PLMN and an SNPN are not supported using an SNPN subscription given that the SNPNs are not relying on network functions provided by the PLMN.

The NID shall support two assignment models:
   Self-assignment: NIDs are chosen individually by SNPNs at deployment time (and may therefore not be unique) but use a different numbering space than the coordinated assignment NIDs.
   Coordinated assignment: NIDs are assigned using one of the following two options:
   1) The NID is assigned such that it is globally unique independent of the PLMN ID used; or
   2) The NID is assigned such that the combination of the NID and the PLMN ID is globally unique.

An optional human-readable network name helps to identify an SNPN during manual SNPN selection.

2. Broadcast System Information

NG-RAN nodes which provide access to SNPNs broadcast the following information:
   One or multiple PLMN IDs; and/or
   List of NIDs per PLMN ID identifying the non-public networks NG-RAN provides access to. It is assumed that an NG-RAN node supports broadcasting a total of twelve NIDs. The presence of a list of NIDs for a PLMN ID indicates that the related PLMN ID and NIDs identify SNPNs.

Further, the NG-RAN nodes which provide access to SNPNs broadcast optionally the following information:

A human-readable network name per SNPN. The human-readable network name per SNPN is only used for manual SNPN selection;

Information to prevent UEs not supporting SNPNs from accessing the cell, e.g. if the cell only provides access to non-public networks;

An indication per SNPN of whether access using credentials from a Credentials Holder is supported;

List of supported Group IDs for Network Selection (GINs or GIDs) per SNPN. GIN reuses the NID encoding and can be self-managed or globally unique. GIN may be represented/expressed by a pair (or, combination) of PLMN ID and NID; and/or An indication per SNPN of whether the SNPN allows registration attempts from UEs that are not explicitly configured to select the SNPN, i.e. UEs that do not have any PLMN ID and NID nor GIN broadcast by the SNPN in the Credentials Holder controlled prioritized lists of preferred SNPNs/GINs.

3. UE Configuration and Subscription Aspects

An SNPN-enabled UE is configured with the following information for each subscribed SNPN:
   PLMN ID and NID of the SNPN;
   Subscriber identifier (SUPI) and credentials;
   Optionally, an N3IWF FQDN and an identifier of the country where the configured N3IWF is located;
   Optionally, if the UE supports access to an SNPN using credentials from a Credentials Holder:
   User controlled prioritized list of preferred SNPNs;
   Credentials Holder controlled prioritized list of preferred SNPNs;
   Credentials Holder controlled prioritized list of GINs.

The Credentials Holder controlled prioritized lists of preferred SNPNs and GINs can be updated by the Credentials Holder.

A subscriber of an SNPN is either:
   identified by a SUPI containing a network-specific identifier that takes the form of a Network Access Identifier (NAI) using the NAI RFC based user identification. The realm part of the NAI may include the NID of the SNPN; or
   identified by a SUPI containing an IMSI.

In the case of access to an SNPN using credentials owned by a Credentials Holder, the SUPI shall also contain identification for the Credentials Holder (i.e., the realm in the case of Network Specific Identifier based SUPI or the MCC and MNC in the case of an IMSI based SUPI).

When Credentials Holder is an SNPN, and the MCC and MNC of the SNPN is not unique, then IMSI based SUPI is not supported as the MCC and MNC need not be unique always; instead USIM credentials are supported using Network Specific Identifier based SUPI.

Network Specific Identifier are not supported for the case the Credentials Holder is provided by a PLMN.

An SNPN-enabled UE that supports access to an SNPN using credentials from a Credentials Holder and that is equipped with a PLMN subscription may additionally be configured with the following information for SNPN selection and registration using the PLMN subscription in SNPN access mode:
   User controlled prioritized list of preferred SNPNs;
   Credentials Holder controlled prioritized list of preferred SNPNs;
   Credentials Holder controlled prioritized list of preferred GINs.

The Credentials Holder controlled prioritized lists of preferred SNPNs and GINs can be updated by the Credentials Holder.

4. Network Selection in SNPN Access Mode

An SNPN-enabled UE supports the SNPN access mode. When the UE is set to operate in SNPN access mode the UE only selects and registers with SNPNs over Uu. Emergency services are not supported in SNPN access mode.

If a UE is not set to operate in SNPN access mode, even if it is SNPN-enabled, the UE does not select and register with SNPNs. A UE not set to operate in SNPN access mode performs PLMN selection procedures. For a UE capable of simultaneously connecting to an SNPN and a PLMN, the setting for operation in SNPN access mode is applied only to the Uu interface for connection to the SNPN.

An SNPN-enabled UE that supports access to an SNPN using credentials from a Credentials Holder and that is equipped with a PLMN subscription needs to first enter SNPN access mode to be able to select SNPNs. Once the UE has entered SNPN access mode, SNPN selection is performed. Once an SNPN has been selected, the UE attempts registration in the SNPN using the PLMN credentials. Details of activation and deactivation of SNPN access mode are up to UE implementation.

When a UE is set to operate in SNPN access mode, the UE does not perform normal PLMN selection procedures.

UEs operating in SNPN access mode read the information from the broadcast system information and take them into account during network selection.

4-1. Automatic Network Selection

If the UE has multiple SNPN subscriptions, it is assumed that the subscription to use for automatic selection is determined by implementation specific means prior to network selection.

For automatic network selection, the UE selects and attempts registration on available and allowable SNPNs in the following order:

the SNPN the UE was last registered with (if available);

the SNPN identified by the PLMN ID and NID for which the UE has SUPI and credentials;

If the UE supports access to an SNPN using credentials from a Credentials Holder, then the UE continues by selecting and attempting registration on available and allowable SNPNs which broadcast the indication that access using credentials from a Credentials Holder is supported in the following order:

1> SNPNs in the user controlled prioritized list of preferred SNPNs (in priority order);

2> SNPNs in the Credentials Holder controlled prioritized list of preferred SNPNs (in priority order);

3> SNPNs, which additionally broadcast a GIN contained in the Credentials Holder controlled prioritized list of preferred GINs (in priority order). If multiple SNPNs are available that broadcast the same GIN, the order in which the UE selects and attempts a registration with those SNPNs is implementation specific.

4> SNPNs, which additionally broadcast an indication that the SNPN allows registration attempts from UEs that are not explicitly configured to select the SNPN, i.e. the broadcasted NID or GIN is not present in the Credentials Holder controlled prioritized lists of preferred SNPNs/GINs in the UE. If multiple SNPNs are available that broadcast the indication that the SNPN allows registration attempts from UEs that are not explicitly configured to select the SNPN, the order in which the UE selects and attempts a registration with those SNPNs is implementation specific.

When a UE performs Initial Registration to an SNPN, the UE shall indicate the PLMN ID and NID as broadcast by the selected SNPN to NG-RAN. NG-RAN shall inform the AMF of the selected PLMN ID and NID.

4-2. Manual Network Selection

For manual network selection UEs operating in SNPN access mode provide to the user the list of SNPNs (each is identified by a PLMN ID and NID) and related human-readable names (if available) of the available SNPNs the UE has respective SUPI and credentials for. If the UEs supports access to an SNPN using credentials from a Credentials Holder, the UE also presents available SNPNs which broadcast the "access using credentials from a Credentials Holder is supported" indication.

The UE indicates to the user any available SNPNs which meet the criteria specified in bullets a) and b). If the UE does not support access to an SNPN using credentials from a credentials holder, this includes SNPNs in the list of "permanently forbidden SNPNs", and the list of "temporarily forbidden SNPNs". The UE may indicate to the user whether the available SNPNs are present in the list of "temporarily forbidden SNPNs" or the list of "permanently forbidden SNPNs". If the UE supports access to an SNPN using credentials from a credentials holder, this includes SNPNs in the lists of "permanently forbidden SNPNs", and the lists of "temporarily forbidden SNPNs" associated with each entry of the "list of subscriber data" or the PLMN subscription. The UE may indicate to the user whether the available SNPNs are present in a list of "temporarily forbidden SNPNs" or a list of "permanently forbidden SNPNs" for an entry of the "list of subscriber data" or the PLMN subscription.

a) SNPNs identified by an SNPN identity in an entry of the "list of subscriber data" in the ME, if any. The order in which those SNPNs are indicated is UE implementation specific;

b) if the UE supports access to an SNPN using credentials from a credentials holder, for the SNPNs which broadcast the indication that access using credentials from a credentials holder is supported:

b-1) each SNPN which is identified by an SNPN identity contained in one of the user controlled prioritized lists of preferred SNPNs configured in the ME. SNPNs included in the same list are indicated in the order in which they are included in the list. Prioritization between the different lists is UE implementation specific;

b-2) each SNPN which is identified by an SNPN identity contained in one of the credentials holder controlled prioritized lists of preferred SNPNs configured in the ME. SNPNs included in the same list are indicated in the order in which they are included in the list. Prioritization between the different lists is UE implementation specific;

b-3) each SNPN which broadcasts a GIN contained in one of the credentials holder controlled prioritized lists of GINs configured in the ME. SNPNs broadcasting a GIN included in the same list are indicated in the order in which the GIN is included in the list. Prioritization between the different lists is UE implementation specific. If more than one SNPN broadcast the same GIN, the order in which those SNPNs are indicated is UE implementation specific; and b-4) each SNPN identified by an SNPN identity which is included neither in the SNPN selection parameters of the entries of the "list of subscriber data" nor in the SNPN selection parameters associated with the PLMN subscription and which does not broadcast a GIN which is included in one of the credentials holder controlled prioritized lists of GINs configured in the ME. The order in which those SNPNs are indicated is UE implementation specific.

For each of the SNPNs indicated to the user, the UE shall forward a human-readable network name along with the SNPN identity to the upper layers if the system information broadcasted for the SNPN includes the human-readable network name for the SNPN.

The UE shall limit its search for the SNPN to the NG-RAN access technology.

The user may select an SNPN and the UE then initiates registration on this SNPN using the NG-RAN access technology, the subscriber identifier and the credentials from the selected entry of the "list of subscriber data" or from USIM, if the PLMN subscription is selected, determined as follows:

for bullet a) above, the entry of the "list of subscriber data", with the SNPN identity matching the selected SNPN (this may take place at any time during the presentation of SNPNs), shall be considered as selected;

for bullet b-1) above:
i) the entry of the "list of subscriber data" which contains the user controlled prioritized lists of preferred SNPNs that includes the SNPN identity of the selected SNPN shall be considered as selected, if the user controlled prioritized list of preferred SNPNs that includes the SNPN identity of the selected SNPN is included in the entry of the "list of subscriber data"; or
ii) the PLMN subscription shall be considered as selected, if the user controlled prioritized list of preferred SNPNs associated with the PLMN subscription includes the SNPN identity of the selected SNPN;

for bullet b-2) above:
i) the entry of the "list of subscriber data" which contains the credentials holder controlled prioritized list of preferred SNPNs that includes the SNPN identity of the selected SNPN shall be considered as selected, if the credentials holder controlled prioritized list of preferred SNPNs that includes the SNPN identity of the selected SNPN is included in the entry of the "list of subscriber data"; or
ii) the PLMN subscription shall be considered as selected, if the credentials holder controlled prioritized list of preferred SNPNs associated with the PLMN subscription includes the SNPN identity of the selected SNPN;

for bullet b-3) above:
i) the entry of the "list of subscriber data" which contains the credentials holder controlled prioritized list of GINs that includes the GIN broadcast by the selected SNPN shall be considered as selected, if the credentials holder controlled prioritized list of GINs that includes the GIN broadcast by the selected SNPN is included in the entry of the "list of subscriber data"; or
ii) the PLMN subscription shall be considered as selected, if the credentials holder controlled prioritized list of GINs associated with the PLMN subscription includes the GIN broadcast by the selected SNPN; and for bullet b-4) above, the entry of the "list of subscriber data" or the PLMN subscription shall be selected by UE implementation specific means.

If the SNPN identity of the selected SNPN is included in more than one of the following: one or more user controlled prioritized list(s) of preferred SNPNs configured in the ME, one or more credentials holder controlled prioritized list(s) of preferred SNPNs configured in the ME or the list of SNPNs which are broadcasting a GIN included in one or more credentials holder controlled prioritized list(s) of GINs configured in the ME, which subscription is selected is MS implementation specific.

Once the UE has registered on an SNPN selected by the user, the UE shall not automatically register on a different SNPN unless the user selects automatic SNPN selection mode.

If the user does not select an SNPN, the selected SNPN shall be the one that was selected either automatically or manually before the SNPN selection procedure started. If no such SNPN was selected or that SNPN is no longer available, then the UE shall attempt to camp on any acceptable cell and enter the limited service state.

When a UE performs Initial Registration to an SNPN, the UE shall indicate the selected PLMN ID and NID as broadcast by the selected SNPN to NG-RAN. NG-RAN shall inform the AMF of the selected PLMN ID and NID.

5. Network Access Control

If a UE performs the registration or service request procedure in an SNPN identified by a PLMN ID and a self-assigned NID and there is no subscription for the UE, then the AMF shall reject the UE with an appropriate cause code to temporarily prevent the UE from automatically selecting and registering with the same SNPN.

If a UE performs the registration or service request procedure in an SNPN identified by a PLMN ID and a coordinated assigned NID and there is no subscription for the UE, then the AMF shall reject the UE with an appropriate cause code to permanently prevent the UE from automatically selecting and registering with the same SNPN.

In order to prevent access to SNPNs for authorized UE(s) in the case of network congestion/overload, Unified Access Control information is configured per SNPN (i.e. as part of the subscription information that the UE has for a given SNPN) and provided to the.

6. Cell (Re-)Selection in SNPN Access Mode

UEs operating in SNPN access mode only select cells and networks broadcasting both PLMN ID and NID of the selected SNPN.

7. Access to PLMN Services Via Stand-Alone Non-Public Networks

To access PLMN services, a UE in SNPN access mode that has successfully registered with an SNPN may perform another registration via the SNPN User Plane with a PLMN (using the credentials of that PLMN) following architectural principles including the optional support for PDU Session continuity between PLMN and SNPN using the Handover of a PDU Session procedures and the SNPN taking the role of "Untrusted non-3GPP access".

QoS differentiation in the SNPN can be provided on per-IPsec Child Security Association basis by using the UE or network requested PDU Session Modification procedure. In the PLMN, N3IWF determines the IPsec child SAs. The N3IWF is preconfigured by PLMN to allocate different IPsec child SAs for QoS Flows with different QoS profiles.

To support QoS differentiation in the SNPN with network-initiated QoS, the mapping rules between the SNPN and the PLMN are assumed to be governed by an SLA including: 1) mapping between the DSCP markings for the IPsec child SAs on NWu and the corresponding QoS, which is the QoS requirement of the PLMN and is expected to be provided by the SNPN, and 2) N3IWF IP address(es) in the PLMN. The non-alteration of the DSCP field on NWu is also assumed to be governed by an SLA and by transport-level arrangements that are outside of 3GPP scope. The packet detection filters in the SNPN can be based on the N3IWF IP address and the DSCP markings on NWu.

To support QoS differentiation in the SNPN with UE-requested QoS, the UE can request for an IPsec SA the same 5QI from the SNPN as the 5QI provided by the PLMN. It is assumed that UE-requested QoS is used only when the 5QIs used by the PLMN are from the range of standardized 5QIs. The packet filters in the requested QoS rule can be based on the N3IWF IP address and the SPI associated with the IPsec SA.

When the UE accesses the PLMN over NWu via a SNPN, the AMF in the serving PLMN shall send an indication toward the UE during the Registration procedure to indicate whether an IMS voice over PS session is supported or not.

8. Access to Stand-Alone Non-Public Network Services Via PLMN

To access SNPN services, a UE that has successfully registered with a PLMN over 3GPP access may perform another registration via the PLMN User Plane with an SNPN (using the credentials of that SNPN) following the architectural principles including the optional support for PDU Session continuity between PLMN and SNPN using the Handover of a PDU Session procedures and the PLMN taking the role of "Untrusted non-3GPP access" of the SNPN, i.e. using the procedures for Untrusted non-3GPP access.

QoS differentiation in the PLMN can be provided on per-IPsec Child Security Association basis by using the UE or network requested PDU Session Modification procedure. In the SNPN, N31WF determines the IPsec child SAs. The N3IWF is preconfigured by SNPN to allocate different IPsec child SAs for QoS Flows with different QoS profiles.

To support QoS differentiation in the PLMN with network-initiated QoS, the mapping rules between the PLMN and the SNPN are assumed to be governed by an SLA including: 1) mapping between the DSCP markings for the IPsec child SAs on NWu and the corresponding QoS, which is the QoS requirement of the SNPN and is expected to be provided by the PLMN, and 2) N31WF IP address(es) in the SNPN. The non-alteration of the DSCP field on NWu is also assumed to be governed by an SLA and by transport-level arrangements that are outside of 3GPP scope. The packet detection filters in the PLMN can be based on the N3IWF IP address and the DSCP markings on NWu.

To support QoS differentiation in the PLMN with UE-requested QoS, the UE can request for an IPsec SA the same 5QI from the PLMN as the 5QI provided by the SNPN. It is assumed that UE-requested QoS is used only when the 5QIs used by the SNPN are from the range of standardized 5QIs. The packet filters in the requested QoS rule can be based on the N3IWF IP address and the SPI associated with the IPsec SA.

When the UE accesses the SNPN over Nwu via a PLMN, the AMF in the serving SNPN shall send an indication toward the UE during the Registration procedure to indicate whether an IMS voice over PS session is supported or not. Emergency services are not supported when the UE accesses the SNPN over NWu via a PLMN.

Hereinafter, SNPN connectivity for UEs with credentials owned by an external credential holder is described.

SNPNs may support UE access using credentials owned by a Credentials Holder separate from the SNPN. In this case the Session Management procedures (i.e. PDU Sessions) terminate in an SMF in the SNPN.

When an SNPN supports UE access using credentials assigned by a Credentials Holder separate from the SNPN, it is assumed that is supported homogeneously within the whole SNPN.

Figure 11:
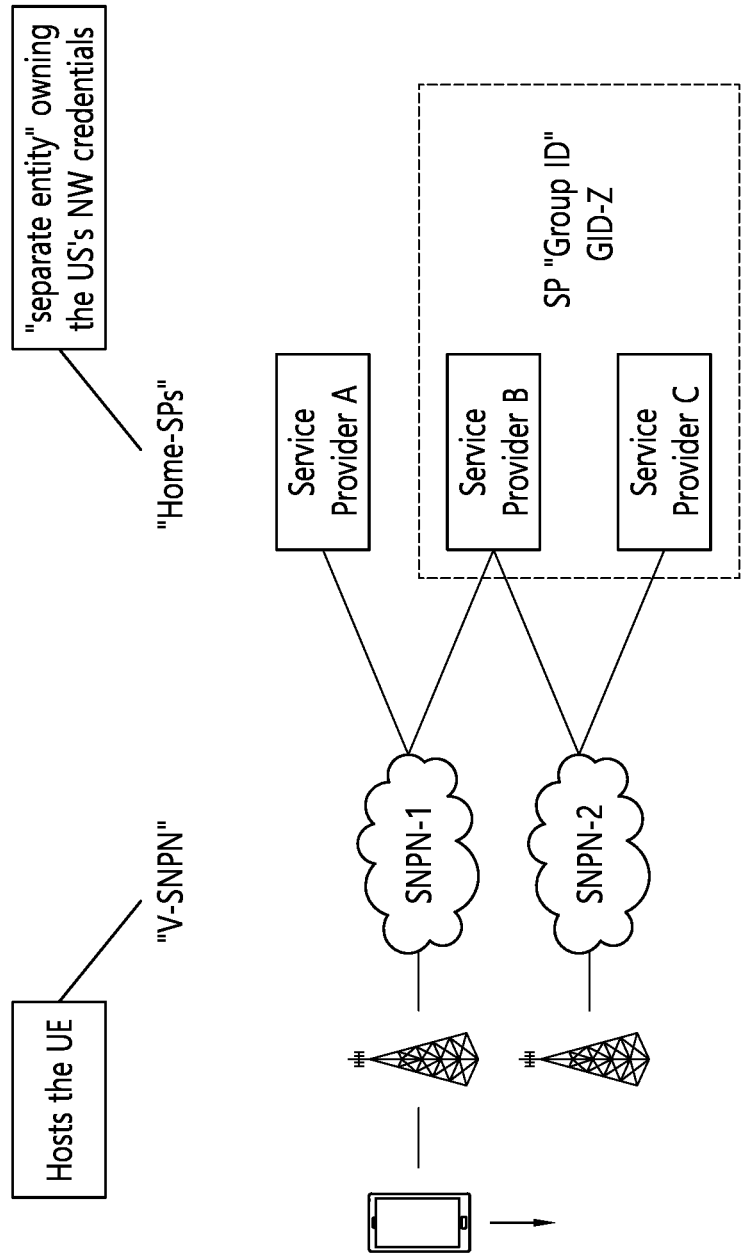
FIG. 11 shows an example of an SNPN connectivity for UEs with credentials owned by an external credential holder according to an embodiment of the present disclosure.

FIG. 11 shows an example of an SNPN connectivity for UEs with credentials owned by an external credential holder according to an embodiment of the present disclosure. In the disclosure, entities separate from the SNPN holding credentials (e.g., external credential holders) may comprise a home service provider (SP).

Referring to FIG. 11, a visited-SNPN (V-SNPN) may broadcast information that enables a UE to determine whether the UE can access the V-SNPN using any of the home SP credentials that the UE is configured with.

In particular, a V-SNPN may broadcast identities of home SPs that the V-SNPN has an agreement with, i.e., which supports access to the V-SNPN using the credentials of those home SPs.

The V-SNPN may also broadcast the identities of home SP groups that the V-SNPN has an agreement with for access to the V-SNPN using the credentials of any of the home SPs that are part of the home SP group. The UE may be assumed to be configured by the home SP with one or more home SP groups that the home SP is part of so that the UE can select a V-SNPN that supports one of the home SP groups the UE is configured with. One benefit of the home SP group is that the V-SNPN does not need to broadcast the identities of all the home SPs that are part of the home SP group but only needs to broadcast the home SP group ID instead. In the disclosure, the home SP group ID is an example of GIN/GID.

For example, home SP group may include:

National operating companies of a multi-national operator. By broadcasting the home SP group ID assigned to the multi-national operator, a V-SNPN can enable the UEs from all the national operating companies of the multi-national operator to select the V-SNPN (instead of having to broadcast the home SP IDs of each of the national operating companies, which may also exceed the number of home SP IDs supported by SIB);

Home SPs that are connected to an interconnection provider. Typically mobile operators have direct interconnections and agreements only with large partner networks. For the large amount of small partner networks, mobile operators typically use the services of an interconnection provider that provides interconnection with a large amount of partner networks while avoiding the need for bilateral agreements and interconnections. By broadcasting the home SP group ID assigned to the interconnection provider, a V-SNPN can enable the UEs from all the home SPs connected to the interconnection provider to select the V-SNPN (instead of having to broadcast the IDs of each of the home SPs, which may also exceed the number of home SP IDs supported by SIB) while also avoiding the need for the home SPs to maintain an accurate list of all the supported V-SNPNs.

The home SP group ID is assumed to be globally unique or self-managed.

Home SP group ID can be based on private enterprise number issued to e.g., a multi-national operator group or to an interconnection provider by internet assigned numbers authority (IANA) in its capacity as the private enterprise number administrator.

If the UE's home SP network is not available, then the UE discovers and selects an SNPN as follows (the UE ignores SNPNs that do not broadcast the indication that access using Home SP credentials is supported):

> 1> If the UE is configured with a user-controlled prioritized list of preferred SNPNs then the UE evaluates the list in priority order. That is, if a PLMN ID and NID in the list matches the PLMN ID and NID of an available SNPN, then the UE selects that SNPN;
> 1> If the UE has not been able to select a network based on the above and the UE is configured with a home SP-controlled prioritized list of preferred SNPNs and home SP groups then the UE evaluates the list in priority order as follows:
>   if a PLMN ID and NID in the list matches the PLMN ID and NID of an available SNPN, then the UE selects that SNPN;
>   if a home SP group ID in the list matches a home SP group ID broadcast by an available SNPN, then the UE selects that SNPN.

Which SNPN to select if multiple SNPNs support access using the same home SP group ID is up to UE implementation.

> 1> If the UE has not been able to select a network based on the above but if an available SNPN broadcasts a supported home SP ID that matches the UE's home SP subscription, then the UE selects that SNPN.

Which SNPN to select if multiple SNPNs broadcast the UE's home SP ID is up to UE implementation.

> 1> If the UE has not been able to select a network based on the above, then the UE selects an available SNPN.

Once the UE has selected an SNPN according to the procedure above, the UE performs the Registration procedure. The UE provides the SUCI of the home SP subscription. The UE is authenticated by the home SP.

If the UE's RPLMN or (E) HPLMN is not available, then the UE discovers and selects an SNPN or PLMN as follows (it is assumed that the UE ignores SNPNs that do not broadcast the indication that access using Home SP credentials is supported):

> 1> If the UE is configured with a user-controlled prioritized list of preferred SNPNs and PLMNs then the UE evaluates the list in priority order as follows:
>   if a PLMN ID and NID in the list matches the PLMN ID and NID of an available SNPN, then the UE selects that SNPN.
>   if a PLMN ID in the list matches the PLMN ID of an available PLMN, then the UE selects that PLMN.
> 1> If the UE has not been able to select a network based on the above and the UE is configured with a Home SP-controlled prioritized list of preferred SNPNs, Home SP Groups and PLMNs then the UE evaluates the list in priority order as follows:
>   if a PLMN ID and NID in the list matches the PLMN ID and NID of an available SNPN, then the UE selects that SNPN;
>   if a PLMN ID in the list matches the PLMN ID of an available PLMN, then the UE selects that PLMN;
>   if a Home SP Group ID in the list matches a Home SP Group ID broadcast by an available SNPN, then the UE selects that SNPN.

Which SNPN to select if multiple SNPNs support access using the same Home SP Group ID is up to UE implementation.

> 1> If the UE has not been able to select a network based on the above and the UE is configured with a Visited Network Type Preference indicating "SNPN preferred" or "SNPN only" and an available SNPN broadcasts a supported Home SP ID that matches the UE's Home SP subscription then the UE selects that SNPN.

Which SNPN to select if multiple SNPNs broadcast the UE's Home SP ID is up to UE implementation.

In the disclosure, the term "selecting an available SNPN" assumes the same selection for SNPNs as currently defined for PLMNs.

> 1> If the UE has not been able to select a network based on the above:
> 2> If the UE has been configured with a Visited Network Type Preference, then the UE selects a network as follows:
>   If the Visited Network Type Preference indicates "PLMN only" then the UE ignores available SNPNs and selects an available PLMN.
>   If the Visited Network Type Preference indicates "PLMN preferred" then the UE tries to first select an available PLMN before trying to select an available SNPN.
>   If the Visited Network Type Preference indicates "SNPN only" then the UE tries to select an available SNPN and ignores the PLMNs.
>   If the Visited Network Type Preference indicates "SNPN preferred" then the UE tries to first select an available SNPN before trying to select a PLMN.
> 2> If the UE has not been configured with a Visited Network Type Preference, then the UE selects an available PLMN.

Once the UE has selected an SNPN or PLMN according to the procedure above, the UE performs the Registration procedure. The UE provides the SUCI of the Home SP subscription. The UE is authenticated by the Home SP.

Hereinafter, onboarding of UEs for SNPNs is described.

Onboarding of UEs for SNPNs allows the UE to access an Onboarding Network (ONN) for the purpose of provisioning the UE with SNPN credentials for primary authentication and other information to enable access to a desired SNPN, i.e. (re-)select and (re-)register with SNPN.

To provision SNPN credentials in a UE that is configured with Default UE credentials, the UE selects an SNPN as ONN and establishes a secure connection with that SNPN referred to as Onboarding SNPN (ON-SNPN).

If the UE is already provisioned with a set of CH credentials and needs to be provisioned with an additional set of SNPN credentials, the UE can request PVS address information and leverage the User Plane connection enabled by the available set of CH credentials to get access to a PVS.

To provision SNPN credentials in a UE that is equipped with a USIM configured with PLMN credentials, the UE selects a PLMN as ONN and establishes a secure connection with that PLMN.

After the secure connection is established, the UE is provisioned with SNPN credentials and possibly other data to enable discovery, (re-)selection and (re-)registration for a desired SNPN.

ON-SNPN and subscription owner-SNPN (SON-SNPN) can be roles taken by either an SNPN or different SNPNs. It is possible for the same network to be in both roles with respect to a specific UE.

Figure 12:
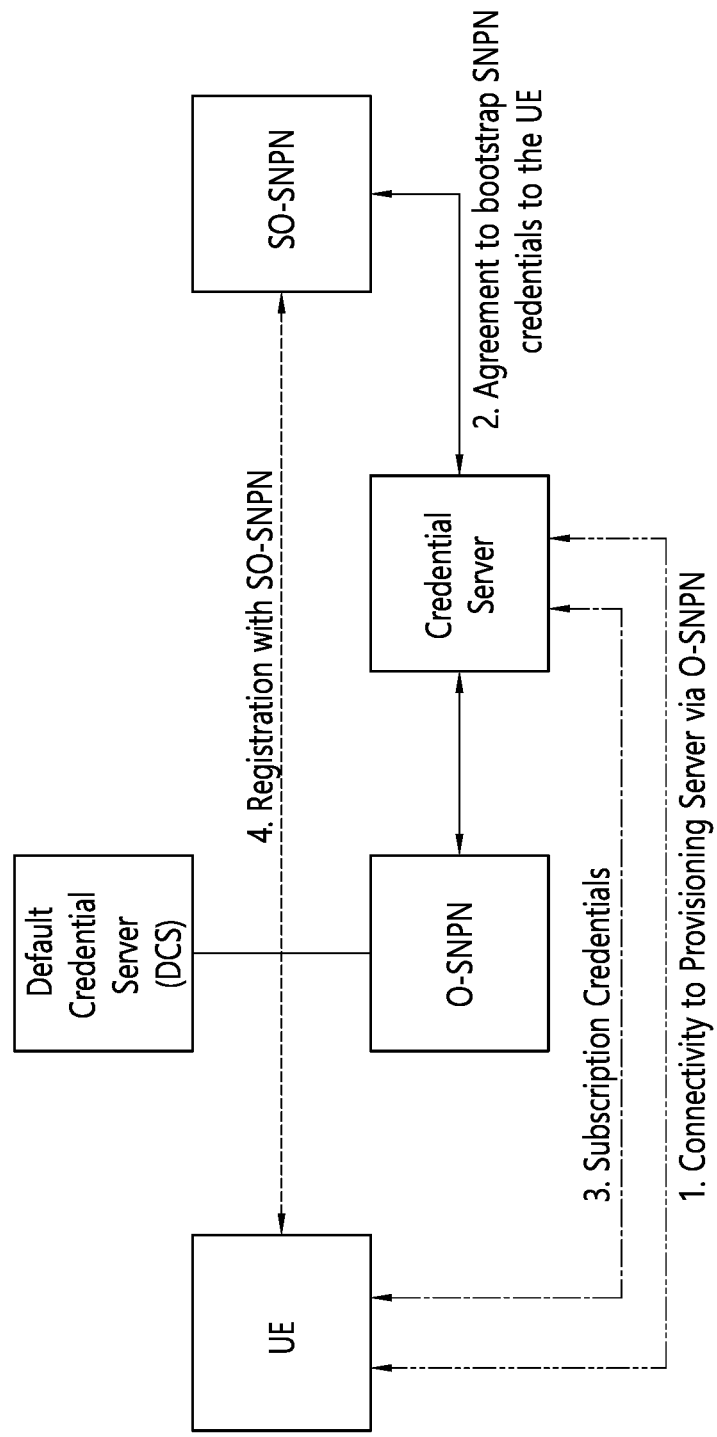
FIG. 12 shows an example of onboarding of UEs for SNPNs according to an embodiment of the present disclosure.

FIG. 12 shows an example of onboarding of UEs for SNPNs according to an embodiment of the present disclosure.

When the UEs are deployed without provisioned subscription, UE onboarding and provisioning for an SNPN may provide a solution on how UE subscription/credentials are afterward provisioned to the UEs. The solution enables UEs to get network connectivity to an ON-SNPN so that it can be provisioned with necessary subscription credentials and configuration for the SON-SNPN that will own the UE's subscription.

Regarding UE onboarding in non-public network:
- The UE is provisioned with some default UE credentials and a unique UE identifier and ON Group IDs (e.g., GIN/GID). The unique UE identifier is assumed to be unique within the DCS. It takes the form of a Network Access Identifier (NAI) which is composed of the user part and the realm part which may identify the domain name of the DCS.
- The UE is not provisioned with subscription credentials that grant access to a SO-PLMN or to an SON-SNPN.
- As part of the onboarding process the UE shall get access granted to an ON-SNPN based on e.g. default UE credentials.
- The Onboarding SNPN (ON-SNPN) that is used by the UE in the onboarding process is not necessarily the same as the SON-SNPN (Subscription Owner SNPN) for which subscription credentials will be provisioned in the UE.
- The ON-SNPN operator has access to a Default Credential Server (DCS), which is used to verify that UE is subject to onboarding based on UE identifier and the associated default UE credentials. The DCS is used for 5GS-level UE authentication/authorization during registration to ON-SNPN for onboarding purpose. The owner of the DCS is out of scope of this document and can be inside or outside of the ON-SNPN e.g. DCS can be owned by the device manufacturer, by a PLMN, by a SNPN other than the ON-SNPN or by a 3rd party. The DCS has the business relationship with the ON-SNPN if the DCS is outside of the ON-SNPN.
- The ON-SNPN operator provides the UE with connectivity to a Provisioning Server that allows UEs to retrieve their subscription credentials and other personalized configuration. In some deployments the DCS and the Provisioning Server can be the same entity. In deployments where the DCS and the Provisioning Server are different entities, it is expected that they communicate with each other to share the security based on the default UE credentials for UE authentication in the Provisioning Server via an interface.
- The SON-SNPN owning the subscription (SON-SNPN) is provisioned to its UDM/UDR from the Provisioning Server the corresponding UE's subscription credentials and provides the Provisioning Server with the corresponding UE's configuration data to be provisioned using the UE onboarding procedure, where default UE credentials is used to identify the corresponding data to be provisioned to the UE.
- The DCS makes a contract with the SON-SNPNs owning the subscription for provisioning the subscriptions to the UE and provides the SON-SNPN with the list of UE identifiers.
- The ON-SNPN broadcasts system information including an identity of ON-SNPN, a Support for Onboarding Indication and optionally a list of ON Group IDs. Selection of ON-SNPN in case of multiple ON-SNPNs supporting UE Onboarding for the UE is up to UE implementation.

UE which is not initially provisioned with subscription credentials may access an Onboarding SNPN (ON-SNPN) and obtain subscription credentials and configuration for an SON-SNPN which can be the same as or different from the ON-SNPN.

The UE selects the ON-SNPN based on information broadcasted by the ON-SNPN and registers to it for onboarding service to obtain connectivity to the Provisioning Server. If the UE is not configured with network selection parameters for ON-SNPN, the ON-SNPN may be manually selected, or the UE may randomly select a network that's available and supports onboarding functionalities. If the UE fails to complete the remote provisioning through the selected ON-SNPN (e.g. the UE fails the authentication by the DCS), the UE may select another ON-SNPN to try the process again. During the registration procedure the ON-SNPN may authenticate the UE with the Default Credential Server (DCS) to determine whether the UE is a genuine device subject to onboarding and authorized to access a Provisioning Server via a Configuration PDU Session. Upon establishment of connectivity to the Provisioning Server, the UE is provisioned with the subscription credentials for the SON-SNPN (i.e. SNPN that will own the UE's subscription) and additional configuration data. Then the UE de-registers from the ON-SNPN, performs a new network selection, and registers the SON-SNPN using the provisioned subscription credentials and configuration data.

When the UE is in SNPN access mode and the UE wants to perform UE onboarding via an SNPN, the UE shall perform ON-SNPN selection as described below, where the ON-SNPN is an SNPN providing access to the UE for UE onboarding. The trigger for the UE to initiate the UE Onboarding procedure is UE implementation dependent (e.g. the trigger can be a power-on event in the UE, or an input by the user).

For automatic or manual selection, the UE may select and attempt to register to an ON-SNPN which broadcast the Onboarding enabled indication and matches the pre-configured ON-SNPN selection information such as SNPN network identifier and/or GIN(s) (if available) according to the UE implementation-specific logic. If the registration fails, the UE may select and attempt to register to a different ON-SNPN.

When the UE is not in SNPN access mode and the UE is using PLMN credentials for accessing a PLMN as the onboarding network (ONN), then regular network selection and regular initial registration procedures apply. After successfully registering to the ON-PLMN, the UE is provisioned with the SON-SNPN credentials via User Plane.

When Onboarding network is a PLMN and the UE's subscription only allows for Remote Provisioning, then based on PLMN policies, the AMF can start an implementation specific timer once the UE has registered to the PLMN. Expiry of this timer triggers the AMF to deregister the UE from the PLMN. This specific timer is used to prevent registered UEs that are only allowed for Remote Provisioning from staying at the PLMN indefinitely.

Meanwhile, as shown in FIGS. 11 and 12, GIDs may be associated with SNPN broadcast by a cell. Given that a cell can support K SNPNs (e.g., K=12) for RAN sharing, if N GIDs per SNPN is explicitly broadcast in the cell, it requires up to N*K GIDs signalling space. Given the maximum SI message size restriction and the signalling size of a GID, the amount of signalling to broadcast N*K GIDs is already considered big even for a small N. If the association exceeds the maximum SI message size, the association needs to be signalled in multiple SIBs. Then UE may need to read SIB1 and those SIB(s), causing delay in network identification and selection. To address this issue, the present disclosure provides a method for efficient signalling of GIDs such that the GID-related information can be efficiently expressed and hence possibly included in the minimum number of SIB(s) (e.g., SIB1 and/or SIB x).

In the disclosure, a cell may broadcast/signal, in SIB x which may be SIB1 or SIB other than the SIB1, a set/list of GIDs and a linkage between the GID set and SNPN. For example, it may be signalling-efficient to express the linkage with bitmap. In this case, the SIB x may comprise information as illustrated in table 5 below:

A bit with positive indication may indicate that the associated SNPN supports the corresponding GID. That is, a bit set to a positive indication in a bitmap informs that a corresponding GID is supported by an SNPN corresponding to the bitmap. Or, a bit set to positive indication may indicate that the GIN is supported by the SNPN. In an example, bit with positive indication may be bit 1, and bit with negative

TABLE 5

-- ASN1START-- TAG-SIBXY-STARTSIBXY-rl7 ::= SEQUENCE { gin-ElementList-rl7 SEQUENCE (SIZE (1..maxGIN-rl7)) OF GIN-Element-rl7 OPTIONAL, -- Need R ginsPerSNPN-List-rl7 SEQUENCE (SIZE (1..maxNPN-rl6)) OF GINs-perSNPN-rl7 OPTIONAL, -- Need R lateNonCriticalExtension OCTET STRING OPTIONAL, ...}GIN-Element-rl7 ::= SEQUENCE { plmn-Identity-rl7 PLMN-Identity, nid-List-rl7 SEQUENCE (SIZE (1..maxGIN-rl7)) OF NID-rl6}GINs-perSNPN-rl7 ::= SEQUENCE { supportedGINs-rl7 BIT STRING (SIZE (1..maxGIN-rl7)) OPTIONAL - - Need R}-- TAG-SIBXY-STOP-- ASN1STOP The SIB x may contain group IDs for network selection (GINs) to support access using credentials from a credentials holder or to enable UE onboarding. The SIB x may be present if there is at least one SNPN that supports either access using credentials from a credentials holder or UE onboarding. In table 5, the GIN-ElementList (e.g., set/list of GIDs) may contain one or more GIN elements. Each GIN element may contain either one GIN, which is identified by a PLMN ID and a NID, or multiple GINs that share the same PLMN ID. The GIN index m (i.e., m-th GID among GIDs related to the set/list of GIDs) may be defined as d1+d2+ 쩰+d(n−1)+i for the GIN/GID included in the n-th entry of the gin-ElementList and the i-th entry of its corresponding GIN-Element, where d(k) is the number of GIN index values used in the k-th gin-ElementList entry.

The ginsPerSNPN-List (e.g., list of bitmaps) may indicate the supported GINs for each SNPN. The network may include the same number of entries as the number of SNPNs (e.g., maxNPN) in snpn-AccessInfoList (e.g., list of SNPN identifiers) in provided in SIB1, and the n-th entry in this list may correspond to the n-th SNPN listed in snpn-AccessInfoList provided in SIB1. It is not present if there is only a single SNPN in snpn-AccessInfoList in SIB1, as in that case all GINs in this SIB is associated with that SNPN.

The supportedGINs (e.g., ginsPerSNPN and/or bitmap) may indicate the GINs which are supported by the given SNPN. The first/leftmost bit may correspond to the GIN with GIN index 0, the second bit may correspond to the GIN with GIN index 1 and so on. A bit set to 1 may indicate that the GIN is supported by the SNPN. If the field is not present, then the corresponding SNPN does not support any GINs.

The length/size of the bitmap may be the number of GIDs signalled in the set/list of GIDs (e.g., maxGIN, the number of GIN indexes and/or the number of GIDs related to the set/list of GIDs) broadcast by the cell.

The leftmost bit of the bitmap of the associated SNPN may correspond to a first entry of the set/list of GIDs, and the second leftmost bit of the bitmap of the associated SNPN may correspond to a second entry of the set/list of GIDs, etc (or, the reverse correspondence may also be possible). That is, k-th bit from left side in each bitmap may correspond to k-th GID among GIDs related to the set/list of GIDs. Or, the first/leftmost bit may correspond to the GIN with GIN index 0, the second bit may correspond to the GIN with GIN index 1, and so on.

indication may be bit 0. In another example, bit with positive indication may be bit 0, and bit with negative indication may be bit 1.

Figure 13:
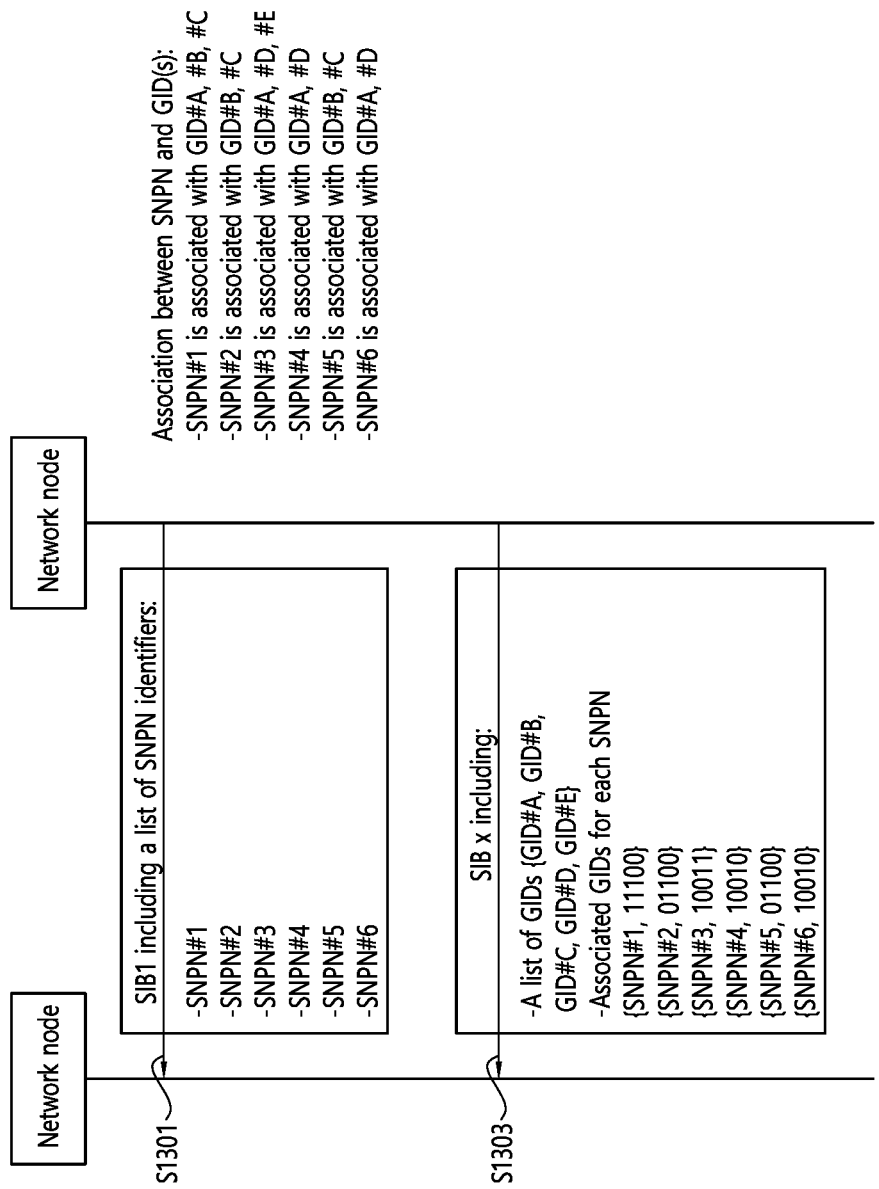
FIG. 13 shows an example of a signal flow for signalling a linkage between each SNPN and a GID set for each SNPN according to an embodiment of the present disclosure.

For signalling of bitmaps for SNPNs, the cell may signal a pair of {SNPN ID, bitmap} for each SNPN. Or, the cell may signal a list of bitmaps, where each bitmap is associated with a SNPN in the SNPN list (i.e., list of SNPN identifiers) in order that is supported and signalled by the cell (the first bitmap of the bitmap list corresponds to the first SNPN identified in the SNPN list, etc). That is, the n-th entry in the list of bitmaps may correspond to n-th SNPN identified in the list of SNPN identifiers. This example is illustrated in FIG. 13.

Figure 14:
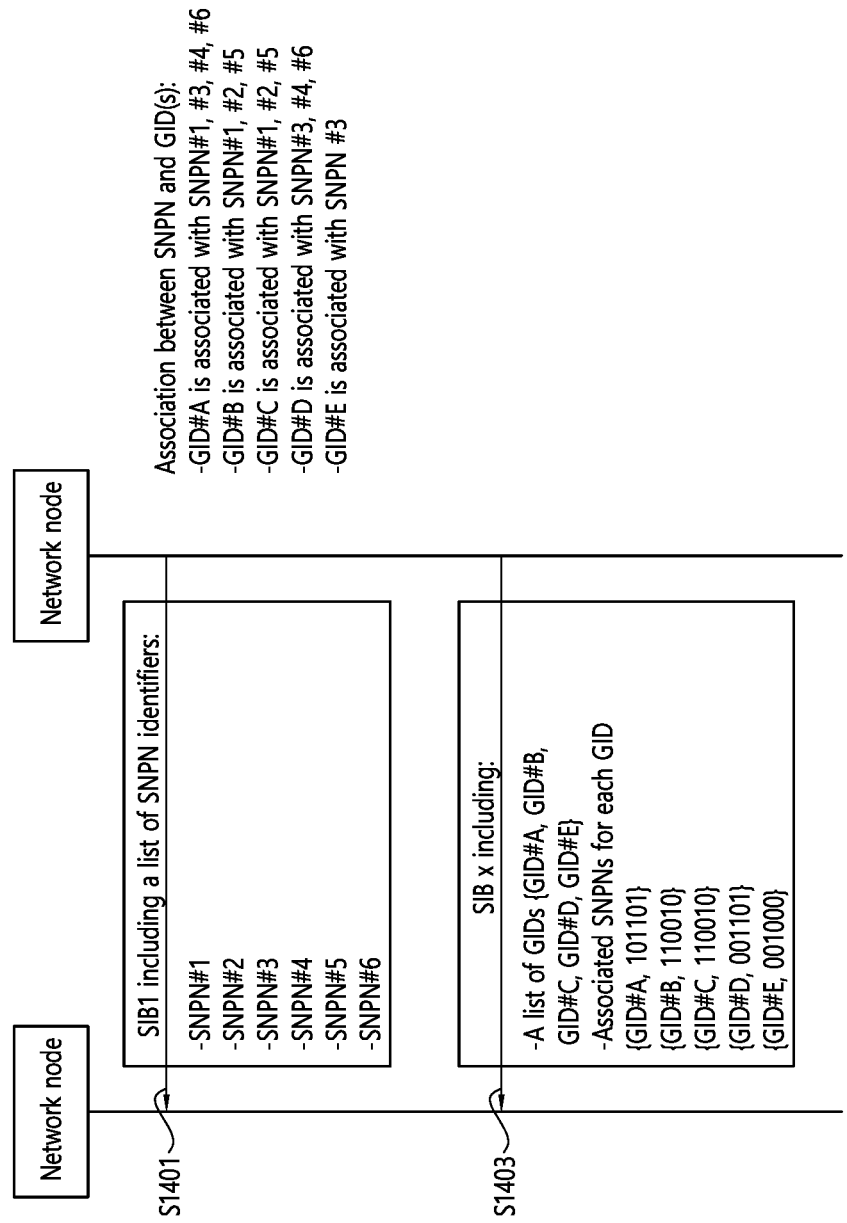
FIG. 14 shows an example of a signal flow for signalling a linkage between each GID and a SNPN set for each GID according to an embodiment of the present disclosure.

For signalling of bitmaps for GIDs, the cell may signal a pair of {GID ID, bitmap} for each SNPN. Or, the cell may signal a list of bitmaps, where each bitmap is associated with a GID in the GID list (i.e., list of GIDs) in order that is supported and signalled by the cell (the first bitmap of the bitmap list corresponds to the first GID in the GID list, etc). That is, the n-th entry in the list of bitmaps may correspond to n-th group identifier among group identifiers related to the list of group identifiers. This example is illustrated in FIG. 14.

With this efficient signalling of GIDs and association between GIDs and SNPN, network can signal the association between GIDs and SNPNs in a minimum number of SIBs. For example, if signalling of GIDs and association between GIDs and SNPN is all included in SIB1, the UE can immediately check upon only reading SIB1 whether the cell can be accessible by onboarding or using credentials owned by a credential holder separate from SNPN (i.e., using external subscription and credential). if signalling of GIDs and association between GIDs and SNPN is all included in other SIB (e.g., SIB x) dedicated for the association between GINs and SNPNs, the UE can check whether the cell is accessible only upon reading SIB1 and SIB x.

With this efficient signalling of GIDs and association between GIDs and SNPN, one SI message or SIB1 message can indicate more number of GINs per SNPN within a given SIB, compared to explicit signaling of associated GINs in RAN sharing cases.

A cell may want to signal the GID information (i.e., list of SNPN identifiers, list of GIDs and association between GID(s) and SNPN(s)) in SIB1 for some SNPNs and in other SIB for other SNPNs. In this case, if GID information in SIB1 is available for a concerned SNPN, the UE may only consider the GID information in SIB1 even if other SIB including GID information is available so that the UE can avoid additional SIB reading. If GID information in SIB1 is not available for a concerned SNPN but other SIB including GID information is scheduled, UE may read additional SIB and check if the cell is accessible by onboarding or using credentials owned by a credential holder separate from SNPN (i.e., using external subscription and credential).

FIG. 13 shows an example of a signal flow for signalling a linkage between each SNPN and a GID set for each SNPN according to an embodiment of the present disclosure.

Referring to FIG. 13, association between SNPN and GID(s) is assumed as:

SNPN #1 is associated with GID #A, #B, #C;
SNPN #2 is associated with GID #B, #C;
SNPN #3 is associated with GID #A, #D, #E;
SNPN #4 is associated with GID #A, #D;
SNPN #5 is associated with GID #B, #C; and
SNPN #6 is associated with GID #A, #D.

In step S1301, UE may receive, from a network node, a SIB, e.g., SIB1 including a list of SNPN identifiers. The list of SNPN identifiers may comprise SNPN #1, SNPN #2, SNPN #3, SNPN #4, SNPN #5 and SNPN #6.

In step S1303, the UE may receive, from the network node, a SIB (e.g., SIB x) including a list of GIDs and information indicating associated GIDs for each SNPN in SIB1. The SIB including the GID information may be different from SIB1. The list of GIDs may comprise GID #A, GID #B, GID #C, GID #D and GID #E. The information indicating associated GIDs for each SNPN may comprise a list of bitmaps.

The n-th entry in the list of bitmaps may correspond to n-th SNPN identified in the list of SNPN identifiers, where a SNPN is identified by a combination of PLMN ID and NID. For example, the $1^{st}$ entry in the list of bitmaps (e.g., 11100) may correspond to $1^{st}$ identified SNPN (e.g., SNPN #1) in the list of SNPN identifiers. The $2^{nd}$ entry in the list of bitmaps (e.g., 01100) may correspond to $2^{nd}$ identified SNPN (e.g., SNPN #2) in the list of SNPN identifiers. The $3^{rd}$ entry in the list of bitmaps (e.g., 10011) may correspond to $3^{rd}$ identified SNPN (e.g., SNPN #3) in the list of SNPN identifiers. The $4^{th}$ entry in the list of bitmaps (e.g., 10010) may correspond to $4^{th}$ identified SNPN (e.g., SNPN #4) in the list of SNPN identifiers. The $5^{th}$ entry in the list of bitmaps (e.g., 01100) may correspond to $5^{th}$ identified SNPN (e.g., SNPN #5) in the list of SNPN identifiers. The $6^{th}$ entry in the list of bitmaps (e.g., 10010) may correspond to $6^{th}$ SNPN (e.g., SNPN #6) in the list of SNPN identifiers.

The k-th bit from left side in each bitmap correspond to k-th group identifier among group identifiers related to the list of group identifiers. For example, $1^{st}$ bit from left side in each bitmap correspond to $1^{st}$ group identifier (e.g., GID #A) among group identifiers related to the list of group identifiers. The $2^{nd}$ bit from left side in each bitmap correspond to $2^{nd}$ group identifier (e.g., GID #B) among group identifiers related to the list of group identifiers. The $3^{rd}$ bit from left side in each bitmap correspond to $3^{rd}$ group identifier (e.g., GID #C) among group identifiers related to the list of group identifiers. The $4^{th}$ bit from left side in each bitmap correspond to $4^{th}$ group identifier (e.g., GID #D) among group identifiers related to the list of group identifiers. The $5^{th}$ bit from left side in each bitmap correspond to $5^{th}$ group identifier (e.g., GID #E) among group identifiers related to the list of group identifiers.

A bit set to a positive indication in a bitmap may inform that a corresponding group identifier is supported by a SNPN corresponding to the bitmap. For example, since $1^{st}$, $2^{nd}$ and $3^{rd}$ bits are set to a positive indication in the $1^{st}$ bitmap (e.g., 11100), corresponding group identifiers GID #A, GID #B and GID #3 are supported by a SNPN corresponding to the $1^{st}$ bitmap (e.g., SNPN #1). Since $2^{nd}$ and $3^{rd}$ bits are set to a positive indication in the $2^{nd}$ bitmap (e.g., 01100), corresponding group identifiers GID #B and GID #3 are supported by a SNPN corresponding to the $2^{nd}$ bitmap (e.g., SNPN #2). Since 1, $4^{th}$ and $5^{th}$ bits are set to a positive indication in the $3^{rd}$ bitmap (e.g., 10011), corresponding group identifiers GID #A, GID #D and GID #E are supported by a SNPN corresponding to the $3^{rd}$ bitmap (e.g., SNPN #3). Since $1^{st}$ and $4^{th}$ bits are set to a positive indication in the $4^{th}$ bitmap (e.g., 10010), corresponding group identifiers GID #A and GID #D are supported by a SNPN corresponding to the $4^{th}$ bitmap (e.g., SNPN #4). Since $2^{nd}$ and $3^{rd}$ bits are set to a positive indication in the $5^{th}$ bitmap (e.g., 01100), corresponding group identifiers GID #B and GID #3 are supported by a SNPN corresponding to the $5^{th}$ bitmap (e.g., SNPN #5). Since $1^{st}$ and $4^{th}$ bits are set to a positive indication in the $6^{th}$ bitmap (e.g., 10010), corresponding group identifiers GID #A and GID #D are supported by a SNPN corresponding to the $6^{th}$ bitmap (e.g., SNPN #6).

FIG. 14 shows an example of a signal flow for signalling a linkage between each GID and a SNPN set for each GID according to an embodiment of the present disclosure.

Referring to FIG. 14, association between SNPN and GID(s) is assumed as:

GID #A is associated with SNPN #1, #3, #4, #6;
GID #B is associated with SNPN #1, #2, #5;
GID #C is associated with SNPN #1, #2, #5;
GID #D is associated with SNPN #3, #4, #6; and
GID #E is associated with SNPN #3.

In step S1401, UE may receive, from a network node, SIB1 including a list of SNPN identifiers. The list of SNPN identifiers may comprise SNPN #1, SNPN #2, SNPN #3, SNPN #4, SNPN #5 and SNPN #6.

In step S1303, the UE may receive, from the network node, SIB x including a list of GIDs and associated SNPNs for each GID. The list of GIDs may comprise GID #A, GID #B, GID #C, GID #D and GID #E. The associated SNPNs for each GID may comprise a list of bitmap.

The n-th entry in the list of bitmaps may correspond to n-th group identifier among group identifiers related to the list of group identifiers. For example, the $1^{st}$ entry in the list of bitmaps (e.g., 101101) may correspond to $1^{st}$ GID (e.g., GID #A) among group identifiers related to the list of group identifiers. The $2^{nd}$ entry in the list of bitmaps (e.g., 110010) may correspond to $2^{nd}$ GID (e.g., GID #B) among group identifiers related to the list of group identifiers. The $3^{rd}$ entry in the list of bitmaps (e.g., 110010) may correspond to $3^{rd}$ GID (e.g., GID #C) among group identifiers related to the list of group identifiers. The $4^{th}$ entry in the list of bitmaps (e.g., 001101) may correspond to $4^{th}$ GID (e.g., GID #D) among group identifiers related to the list of group identifiers. The $5^{th}$ entry in the list of bitmaps (e.g., 001000) may correspond to $5^{th}$ GID (e.g., GID #E) among group identifiers related to the list of group identifiers.

The k-th bit from left side in each bitmap correspond to k-th SNPN in the list of SNPN identifiers. For example, $1^{st}$ bit from left side in each bitmap correspond to $1^{st}$ SNPN (e.g., SNPN #1) in the list of SNPN identifiers. The $2^{nd}$ bit from left side in each bitmap correspond to $2^{nd}$ SNPN (e.g., SNPN #2) in the list of SNPN identifiers. The $3^{rd}$ bit from left side in each bitmap correspond to $3^{rd}$ SNPN (e.g., SNPN #3) in the list of SNPN identifiers. The $4^{th}$ bit from left side in each bitmap correspond to 4$^{th}$ SNPN (e.g., SNPN #4) in the list of SNPN identifiers. The 5$^{th}$ bit from left side in each bitmap correspond to 5$^{th}$ SNPN (e.g., SNPN #5) in the list of SNPN identifiers. The 6$^{th}$ bit from left side in each bitmap correspond to 6$^{th}$ SNPN (e.g., SNPN #6) in the list of SNPN identifiers.

A bit set to a positive indication in a bitmap may inform that a corresponding SNPN supports a GID corresponding to the bitmap. For example, since 1$^{st}$, 3$^{rd}$, 4$^{th}$ and 6$^{th}$ bits are set to a positive indication in the 1$^{st}$ bitmap (e.g., 101101), corresponding SNPNs SNPN #1, SNPN #3, SNPN #4 and SNPN #6 support a GID corresponding to the 1$^{st}$ bitmap (e.g., GID #A). Since 1$^{st}$, 2$^{nd}$ and 5$^{th}$ bits are set to a positive indication in the 2$^{nd}$ bitmap (e.g., 110010), corresponding SNPNs SNPN #1, SNPN #2 and SNPN #5 support a GID corresponding to the 2$^{nd}$ bitmap (e.g., GID #B). Since 1, 2$^{nd}$ and 5$^{th}$ bits are set to a positive indication in the 3$^{rd}$ bitmap (e.g., 110010), corresponding SNPNs SNPN #1, SNPN #2 and SNPN #5 support a GID corresponding to the 3$^{rd}$ bitmap (e.g., GID #C). Since 3$^{rd}$, 4$^{rd}$ and 6$^{th}$ bits are set to a positive indication in the 4$^{th}$ bitmap (e.g., 001101), corresponding SNPNs SNPN #3, SNPN #4 and SNPN #6 support a GID corresponding to the 4$^{th}$ bitmap (e.g., GID #D). Since 3$^{rd}$ bit is set to a positive indication in the 5$^{th}$ bitmap (e.g., 001000), corresponding SNPN #3 supports a GID corresponding to the 5$^{th}$ bitmap (e.g., GID #E).

Figure 15:
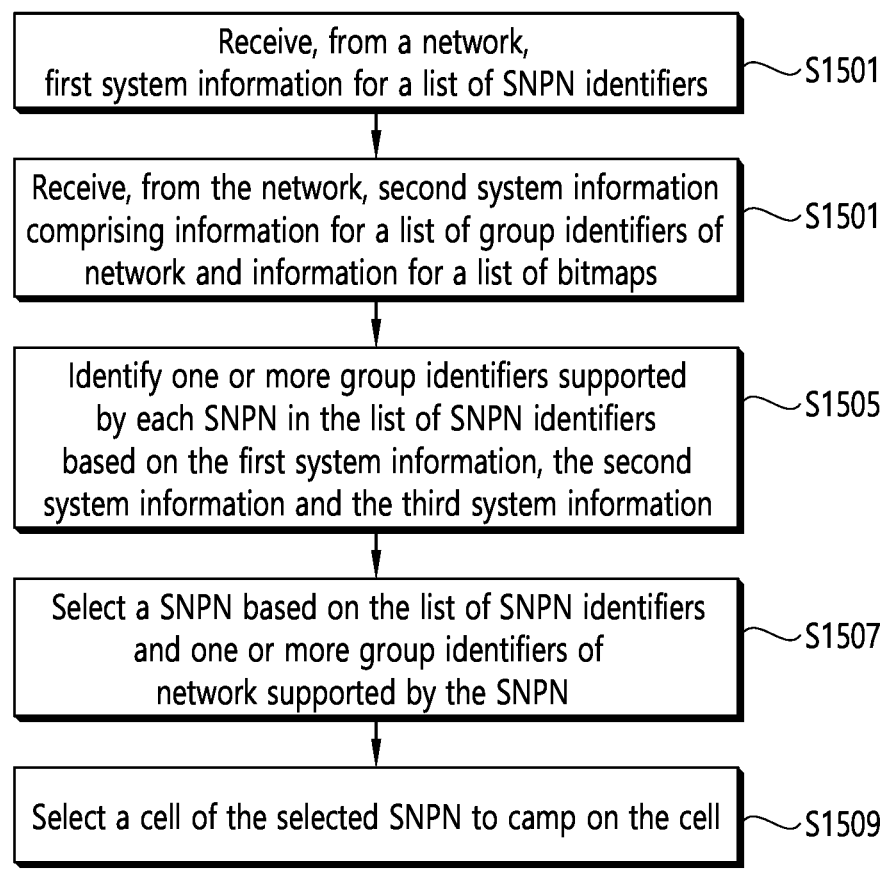
FIG. 15 shows an example of a method performed by a UE according to an embodiment of the present disclosure.

FIG. 15 shows an example of a method performed by a UE according to an embodiment of the present disclosure. The method may also be performed by a wireless device.

Referring to FIG. 15, in step S1501, the UE may receive, from a network, first system information (e.g., SIB1) for a list of stand-alone non-public networks (SNPN) identifiers (e.g., snpn-AccessInfoList).

In step S1503, the UE may receive, from the network, second system information (e.g., SIB x) comprising information for a list of group identifiers of network (e.g., gin-ElementList) and information for a list of bitmaps (e.g., ginsPerSNPN-List).

According to various embodiments, n-th entry (e.g., n-th ginsPerSNPN and/or n-th supportedGINs) in the list of bitmaps may correspond to n-th identified SNPN (e.g., n-th snpn-AccessInfo) in the list of SNPN identifiers of SIB1.

According to various embodiments, k-th bit from left side in each bitmap (e.g., supportedGINs) may correspond to k-th group identifier (e.g., GIN index k) among group identifiers (e.g., GIN indexes) related to the list of group identifiers.

According to various embodiments, a bit set to a positive indication in a bitmap informs that a corresponding group identifier is supported by a SNPN corresponding to the bitmap.

In step S1505, the UE may identify one or more group identifiers (e.g., one or more GINs) supported by each SNPN in the list of SNPN identifiers based on the first system information and the second system information.

In step S1507, the UE may select an SNPN based on the list of SNPN identifiers and one or more group identifiers of network supported by the SNPN.

In step S1509, the UE may select a cell of the selected SNPN to camp on the cell. Once the UE has selected a SNPN, the cell selection procedure shall be performed in order to select a suitable cell of that SNPN to camp on.

According to various embodiments, each of the group identifiers related to the list of group identifiers may be represented by a pair or combination of a public land mobile network (PLMN) identifier (ID) and a network identifier (NID).

According to various embodiments, a size of each bitmap may be identical to a number of the group identifiers related to the list of group identifiers.

According to various embodiments, a number of bitmaps in the list of bitmaps may be identical to a number of SNPNs in the list of SNPN identifiers.

According to various embodiments, each element in the list of group identifiers may comprise a group identifier (ID) for network selection (GIN) element. The GIN element may comprise a public land mobile network (PLMN) ID and a list of one or more network IDs (NIDs).

According to various embodiments, a pair or combination of the PLMN ID and each of the one or more NIDs may represent a GIN among one or more GINs in the GIN element. The GIN may correspond to each of the group identifiers related to the list of group identifiers.

According to various embodiments, the k-th group identifier among the group identifiers related to the list of group identifiers may comprise a GIN index k.

According to various embodiments, the first system information may be included in a system information block type 1 (SIB1). The second system information may be included in an SIB other than the SIB1 and received after the SIB1 is received.

According to various embodiments, the first system information and the second system information may be included in a system information block type 1 (SIB1).

According to various embodiments, the bit set to positive indication may comprise a bit set to 1.

According to various embodiments, the UE may perform an access to the selected SNPN.

According to various embodiments, the group identifiers may be used for the UE to access to an SNPN with credentials owned by a credential holder separate from the SNPN.

According to various embodiments, the group identifiers may be used for onboarding of the UE to an SNPN. The onboarding of the UE to the SNPN may comprise allowing the UE to access an onboarding network (ONN) for providing the UE with SNPN credentials for a primary authentication and information to select and register with the SNPN.

Figure 16:
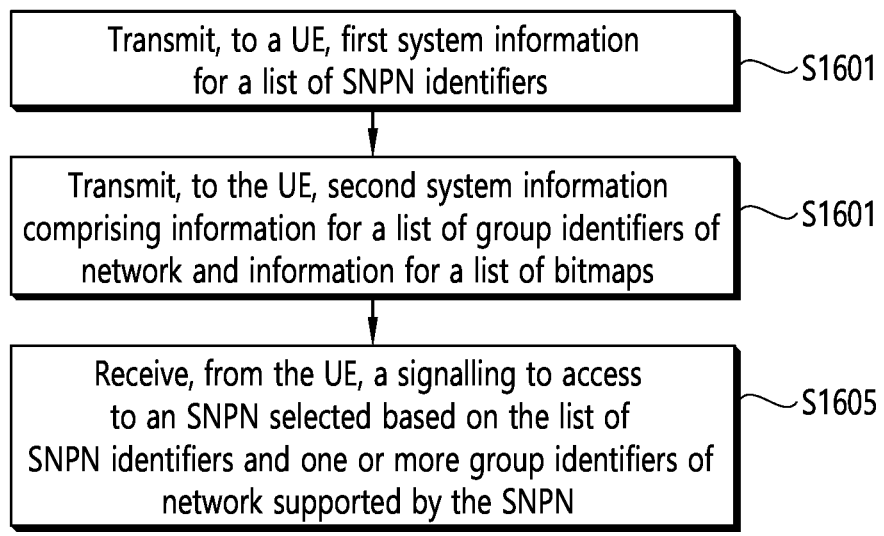
FIG. 16 shows an example of a method performed by a network node according to an embodiment of the present disclosure.

FIG. 16 shows an example of a method performed by a network node according to an embodiment of the present disclosure. The network may comprise a base station (BS).

Referring to FIG. 16, in step S1601, the network node may transmit, to a UE, first system information (e.g., SIB1) for a list of stand-alone non-public networks (SNPN) identifiers (e.g., snpn-AccessInfoList).

In step S1603, the network node may transmit, to the UE, second system information (e.g., SIB x) comprising information for a list of group identifiers of network (e.g., gin-ElementList) and information for a list of bitmaps (e.g., ginsPerSNPN-List).

According to various embodiments, n-th entry (e.g., n-th ginsPerSNPN and/or n-th supportedGINs) in the list of bitmaps may correspond to n-th SNPN (e.g., n-th snpn-AccessInfo) in the list of SNPN identifiers.

According to various embodiments, k-th bit from left side in each bitmap (e.g., supportedGINs) may correspond to k-th group identifier (e.g., GIN index k) among group identifiers (e.g., GIN indexes) related to the list of group identifiers.

According to various embodiments, a bit set to a positive indication in a bitmap informs that a corresponding group identifier is supported by a SNPN corresponding to the bitmap.

In step S1605, the UE may receive, from the UE, a signalling to access to an SNPN selected based on the list of SNPN identifiers and one or more group identifiers of network supported by the SNPN. For example, one or more group identifiers supported by each SNPN in the list of SNPN identifiers may be identified based on the first system information and the second system information.

Furthermore, the method in perspective of the wireless device described above in FIG. 12 may be performed by first wireless device 100 shown in FIG. 2, the wireless device 100 shown in FIG. 3, the first wireless device 100 shown in FIG. 4 and/or the UE 100 shown in FIG. 5.

More specifically, the wireless device comprises at least one transceiver, at least processor, and at least one computer memory operably connectable to the at least one processor and storing instructions that, based on being executed by the at least one processor, perform operations.

The operations may comprise: receiving, from a network, first system information for a list of stand-alone non-public networks (SNPN) identifiers; receiving, from the network, second system information comprising information for a list of group identifiers of network and information for a list of bitmaps; identifying one or more group identifiers supported by each SNPN in the list of SNPN identifiers based on the first system information and the second system information; selecting a SNPN based on the list of SNPN identifiers and one or more group identifiers of network supported by the SNPN; and selecting a cell of the selected SNPN to camp on the cell. The n-th entry in the list of bitmaps corresponds to n-th SNPN in the list of SNPN identifiers. The k-th bit from left side in each bitmap corresponds to k-th group identifier among group identifiers related to the list of group identifiers. A bit set to positive indication in a bitmap informs that a corresponding group identifier is supported by a SNPN corresponding to the bitmap.

Furthermore, the method in perspective of the wireless device described above in FIG. 12 may be performed by a software code 105 stored in the memory 104 included in the first wireless device 100 shown in FIG. 4.

More specifically, at least one computer readable medium (CRM) stores instructions that, based on being executed by at least one processor, perform operations comprising: receiving, from a network, first system information for a list of stand-alone non-public networks (SNPN) identifiers; receiving, from the network, second system information comprising information for a list of group identifiers of network and information for a list of bitmaps; identifying one or more group identifiers supported by each SNPN in the list of SNPN identifiers based on the first system information and the second system information; selecting a SNPN based on the list of SNPN identifiers and one or more group identifiers of network supported by the SNPN; and selecting a cell of the selected SNPN to camp on the cell. The n-th entry in the list of bitmaps corresponds to n-th SNPN in the list of SNPN identifiers. The k-th bit from left side in each bitmap corresponds to k-th group identifier among group identifiers related to the list of group identifiers. A bit set to positive indication in a bitmap informs that a corresponding group identifier is supported by a SNPN corresponding to the bitmap.

Furthermore, the method in perspective of the wireless device described above in FIG. 12 may be performed by control of the processor 102 included in the first wireless device 100 shown in FIG. 2, by control of the communication unit 110 and/or the control unit 120 included in the wireless device 100 shown in FIG. 3, by control of the processor 102 included in the first wireless device 100 shown in FIG. 4 and/or by control of the processor 102 included in the UE 100 shown in FIG. 5.

More specifically, an apparatus for configured to operate in a wireless communication system (e.g., wireless device) comprises at least processor, and at least one computer memory operably connectable to the at least one processor. The at least one processor is configured to perform operations comprising receiving, from a network, first system information for a list of stand-alone non-public networks (SNPN) identifiers; receiving, from the network, second system information comprising information for a list of group identifiers of network and information for a list of bitmaps; identifying one or more group identifiers supported by each SNPN in the list of SNPN identifiers based on the first system information and the second system information; selecting a SNPN based on the list of SNPN identifiers and one or more group identifiers of network supported by the SNPN; and selecting a cell of the selected SNPN to camp on the cell. The n-th entry in the list of bitmaps corresponds to n-th SNPN in the list of SNPN identifiers. The k-th bit from left side in each bitmap corresponds to k-th group identifier among group identifiers related to the list of group identifiers. A bit set to positive indication in a bitmap informs that a corresponding group identifier is supported by a SNPN corresponding to the bitmap.

Furthermore, the method in perspective of the network node described above may be performed by second wireless device 100 shown in FIG. 2, the device 100 shown in FIG. 3, and/or the second wireless device 200 shown in FIG. 4.

More specifically, the network node comprises at least one transceiver, at least processor, and at least one computer memory operably connectable to the at least one processor and storing instructions that, based on being executed by the at least one processor, perform operations.

The operations may comprise: transmitting, to a user equipment (UE), first system information for a list of stand-alone non-public networks (SNPN) identifiers; transmitting, to the UE, second system information comprising information for a list of group identifiers of network and information for a list of bitmaps; and receiving, from the UE, a signalling to access to an SNPN selected based on the list of SNPN identifiers and one or more group identifiers of network supported by the SNPN. One or more group identifiers supported by each SNPN in the list of SNPN identifiers are identified based on the first system information and the second system information. The n-th entry in the list of bitmaps corresponds to n-th SNPN in the list of SNPN identifiers. The k-th bit from left side in each bitmap corresponds to k-th group identifier among group identifiers related to the list of group identifiers. A bit set to positive indication in a bitmap informs that a corresponding group identifier is supported by a SNPN corresponding to the bitmap.

The present disclosure can have various advantageous effects.

For example, signalling overhead required for signalling a GIN list associated with each SNPN may be dramatically reduced. Therefore, the maximum number of GINs that can be signalled can be increased (that is, more GIN signalling space can be guaranteed).

For example, network can configure/apply GINs more flexibly.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a user equipment (UE) configured to operate in a wireless communication system, the method comprising:
   receiving, from a network, information for a list of stand-alone non-public networks (SNPNs);
   receiving, from the network, system information comprising information for a list of group identifiers of the network and information for a list of bitmaps;
   identifying one or more group identifiers supported by each SNPN in the list of SNPNs based on:
   an n-th entry in the list of bitmaps corresponding to an n-th SNPN in the list of SNPNs;
   a k-th bit from a left side in each bitmap corresponding to a k-th group identifier among group identifiers related to the list of group identifiers; and
   a bit set to 1 in a bitmap informing that a corresponding group identifier is supported by a SNPN corresponding to the bitmap;
   selecting a SNPN which broadcasts a group identifier of the network among one or more group identifiers supported by a subscribed SNPN in the list of SNPNs; and
   selecting a cell of the selected SNPN to camp on.

2. The method of claim 1, wherein each of the group identifiers related to the list of group identifiers is represented by a pair or combination of a public land mobile network (PLMN) identifier (ID) and a network identifier (NID).

3. The method of claim 1, wherein a size of each bitmap is identical to a number of the group identifiers related to the list of group identifiers.

4. The method of claim 1, wherein a number of bitmaps in the list of bitmaps is identical to a number of SNPNs in the list of SNPNs.

5. The method of claim 1,
   wherein each element in the list of group identifiers comprises a group identifier (ID) for network selection (GIN) element, and
   wherein the GIN element comprises a public land mobile network (PLMN) ID and a list of one or more network IDs (NIDs).

6. The method of claim 5,
   wherein a pair or combination of the PLMN ID and each of the one or more NIDs represents a GIN among one or more GINs in the GIN element, and
   wherein the GIN corresponds to each of the group identifiers related to the list of group identifiers.

7. The method of claim 6, wherein the k-th group identifier among the group identifiers related to the list of group identifiers comprises a GIN index k.

8. The method of claim 1,
   wherein the information for the list of SNPNs is included in a system information block type 1 (SIB1), and
   wherein the information for the list of group identifiers of network and the information for the list of bitmaps are included in an SIB other than the SIB1 and is received after the SIB1 is received.

9. The method of claim 1, wherein the group identifiers are used for the UE to access to an SNPN with credentials owned by a credential holder separate from the SNPN.

10. The method of claim 1,
    wherein the group identifiers are used for onboarding of the UE to an SNPN, and
    wherein the onboarding of the UE to the SNPN comprises allowing the UE to access an onboarding network (ONN) for providing the UE with SNPN credentials for a primary authentication and information to select and register with the SNPN.

11. The method of claim 1, wherein the UE is in communication with at least one of a network, or autonomous vehicles.

12. A user equipment (UE) configured to operate in a wireless communication system, the UE comprising:
    at least one transceiver;
    at least processor; and
    at least one computer memory operably connectable to the at least one processor and storing instructions that, based on being executed by the at least one processor, perform operations comprising:
    receiving, from a network, information for a list of stand-alone non-public networks (SNPNs);
    receiving, from the network, system information comprising information for a list of group identifiers of network and information for a list of bitmaps;
    identifying one or more group identifiers supported by each SNPN in the list of SNPNs based on:
    an n-th entry in the list of bitmaps corresponding to an n-th SNPN in the list of SNPNs;
    a k-th bit from a left side in each bitmap corresponding to a k-th group identifier among group identifiers related to the list of group identifiers; and
    a bit set to 1 in a bitmap informing that a corresponding group identifier is supported by a SNPN corresponding to the bitmap;
    selecting a SNPN which broadcasts a group identifier of the network among one or more group identifiers supported by a subscribed SNPN in the list of SNPNs; and
    selecting a cell of the selected SNPN to camp on.

13. A network node configured to operate in a wireless communication system, the network node comprising:
    at least one transceiver;
    at least processor; and
    at least one computer memory operably connectable to the at least one processor and storing instructions that, based on being executed by the at least one processor, perform operations comprising:
    constructing a list of stand-alone non-public networks (SNPNs);
    constructing a list of group identifiers of a network;
    constructing a list of bitmaps in which an n-th entry corresponds to an n-th SNPN in the list of SNPNs, wherein the constructing of the list of bitmaps comprises constructing each bitmap in which:

a k-th bit from left side corresponds to a k-th group identifier among group identifiers related to the list of group identifiers; and a bit set to 1 informs that a corresponding group identifier is supported by a SNPN corresponding to each bitmap;

transmitting, to a user equipment (UE), information for the list of SNPNs; and transmitting, to the UE, system information comprising information for the list of group identifiers of network and information for the list of bitmaps.

* * * * *